US012577735B2

(12) United States Patent
Pipol et al.

(10) Patent No.: US 12,577,735 B2
(45) Date of Patent: Mar. 17, 2026

(54) SPIKE TRAY HEAD WITH REPLACEABLE WEAR PLATES

(71) Applicant: S.W.N.G., Inc., Franklin Park, IL (US)

(72) Inventors: Justin J. Pipol, Hartland, WI (US); Daniel M. Henke, Brown Deer, WI (US)

(73) Assignee: S.W.N.G., Inc., Franklin Park, IL (US)

( * ) Notice: Subject to any disclaimer, the term of this patent is extended or adjusted under 35 U.S.C. 154(b) by 172 days.

(21) Appl. No.: 18/491,485

(22) Filed: Oct. 20, 2023

(65) Prior Publication Data

US 2024/0044086 A1 Feb. 8, 2024

Related U.S. Application Data

(62) Division of application No. 16/839,401, filed on Apr. 3, 2020, now Pat. No. 11,795,628.

(60) Provisional application No. 62/833,570, filed on Apr. 12, 2019.

(51) Int. Cl.
*E01B 29/26* (2006.01)
*B25C 7/00* (2006.01)

(52) U.S. Cl.
CPC ................ *E01B 29/26* (2013.01); *B25C 7/00* (2013.01); *E01B 2203/16* (2013.01)

(58) Field of Classification Search
CPC ........ E01B 29/26; E01B 2203/16; B25C 7/00
See application file for complete search history.

(56) References Cited

U.S. PATENT DOCUMENTS

2018/0355559 A1* 12/2018 Pipol ........................ E01B 29/26

* cited by examiner

*Primary Examiner* — Nirvana Deonauth
(74) *Attorney, Agent, or Firm* — Neal, Gerber & Eisenberg LLP

(57) ABSTRACT

Methods and apparatus are disclosed for tray heads and wear plates for tray heads for a railroad spike dispenser. An example wear plate set includes a first wear plate configured to couple to a first sloped surface of a first wall of a tray head. The first wear plate defines a first sloped wear edge along which a head of a railroad spike is to slide when the first wear plate is coupled to the first wall and a shank of the railroad spike travels through a channel. A second wear plate is configured to removably couple to a second sloped surface of a second wall of the tray head. The second wear plate defines a second sloped wear edge along which the head is to slide when the second wear plate is coupled to the second wall and the shank of the railroad spike travels through the channel.

14 Claims, 19 Drawing Sheets

SPIKE TRAY HEAD WITH REPLACEABLE WEAR PLATES

CROSS-REFERENCE TO RELATED APPLICATIONS

This application is a divisional of U.S. Nonprovisional application Ser. No. 16/839,401 filed on Apr. 3, 2020, which claims the benefit of U.S. Provisional Application No. 62/833,570 filed on Apr. 12, 2019. All of these applications are incorporated by reference herein in their entirety.

TECHNICAL FIELD

The present disclosure generally relates to railroad spikes and, more specifically, to wear plates of tray heads for a railroad spike dispenser.

BACKGROUND

Railroad spike machines are configured to drive railroad spikes into the ground to fix components of the railroad to the ground. Conventional railroad spike machines typically include a spike tray that stores the railroad spikes, an actuating device that drives the railroad spikes into the ground, and a tray head that transfers the railroad spikes from the spike tray to the actuating device. Over time, portion(s) of the tray head may wear down due to railroad spikes repeatedly sliding along surface(s) and/or edge(s) of the tray head. In turn, the tray head may need to be replaced in order for the tray head to properly feed railroad spikes to the actuating device that drives the railroad spikes into the ground. The maintenance costs associated with removing the worn-down tray head from the workhead and attaching a new tray head to the workhead may potentially be expensive.

SUMMARY

The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown of tray heads and wear plates for tray heads for a railroad spike dispenser.

An example disclosed tray head of a railroad spike dispenser includes a first wall defining a first sloped surface and a second wall defining a second sloped surface. The first wall and the second wall are parallel to and spaced apart from each other to at least partially define an inlet, an outlet, and a channel extending between the inlet and the outlet for a shank of a railroad spike. The example disclosed tray head also includes a first wear plate removably coupled to the first sloped surface and defining a first sloped wear edge along which a head of the railroad spike is to slide as the shank travels through the channel between the inlet and the outlet. The example disclosed tray head also includes a second wear plate removably coupled to the second sloped surface and defining a first sloped wear edge along which the head of the railroad spike is to slide as the shank travels through the channel between the inlet and the outlet.

In some examples, at least one of the first sloped wear edge and the second sloped wear edge is configured to engage the head of the railroad spike to prevent the railroad spike from falling through the channel. In some examples, to enable the railroad spike to slide from the inlet to the outlet, apexes of the first and second sloped surfaces at least partially define the inlet and nadirs of the first and second sloped surfaces at least partially define the outlet.

In some examples, the first and second wear plates are case hardened. In some such examples, the first and second wear plates include ferritic-nitrocarburized case-hardened steel. In some such examples, the first wall and the second wall include non-case-hardened material.

Some examples include a flange connecting the first wall and the second wall. The flange extends away from the first sloped surface and the second sloped surface to provide access to the channel.

Some examples include a base that is connected to the first wall. The base is configured to couple the tray head to a spike driving workhead of the railroad spike dispenser. In some such examples, the first and second wear plates are configured to be detachable from the first and second walls to enable the first and second wear plates to be replaced while the base remains coupled to the spike driving workhead of the railroad spike dispenser. Some such examples further include a guide support coupled to the base. The guide support is configured to guide the railroad spike from the outlet to feed the railroad spike to an actuating device of the railroad spike dispenser.

Some examples include pins that are configured to guide coupling of the first wear plate to the first wall and the second wear plate to the second wall.

Some examples include threaded fasteners configured to couple the first wear plate to the first wall and the second wear plate to the second wall. In some such examples, the first and second wear plates define through holes and the first and second walls define threaded holes. The threaded fasteners are configured to extend through the through holes and be received by the threaded holes to couple the first wear plate to the first wall and the second wear plate to the second wall. Further, in some such examples, the first and second wear plates define counterbore holes that are concentrically aligned with the through holes and extend from respective upper surfaces of the first and second wear plates to deter the threaded fasteners, when received by the threaded holes, from extending beyond the upper surfaces of the first and second wear plates. Further, in some such examples, the through holes are located adjacent to outer edges opposite the first and second sloped wear edges to deter the through holes from affecting movement of the head of the railroad spike along at least one of the first sloped wear edge and the second sloped wear edge.

In some examples, the first wall defines a first groove on the first sloped and the second wall defines a second groove on the second sloped surface. The first groove forms a first slot when the first wear plate is coupled to the first wall and the second groove forms a second slot when the second wear plate is coupled to the second wall. The first slot is configured to receive a flat tool-head to enable the first wear plate to be pried from the first wall and the second slot is configured to receive the flat tool-head to enable the second wear plate to be pried from the second wall.

In some examples, each of the first sloped wear edge and the second sloped wear edge is concave. In some such examples, each of the first sloped wear edge and the second sloped wear edge includes at least one obtuse angle.

In some examples, the first wear plate and the second wear plate are asymmetrical with respect to each other. In some such examples, the first sloped wear edge is longer than the second sloped wear edge and is configured to extend beyond the second sloped wear edge adjacent the outlet. In some such examples, the first wear plate includes a shelf. The shelf is configured to be adjacent the outlet, extend beyond the second sloped wear edge, and provide a surface on which the head of the railroad spike is to rest adjacent the outlet prior to ejection from the tray head. In some such examples, a portion of the second wear plate adjacent the outlet has a greater height than an opposing portion of the first wear plate.

An example disclosed set of wear plates for a tray head of a spike dispenser includes a first wear plate configured to removably couple to a first sloped surface of a first wall of the tray head. The first wear plate defines a first sloped wear edge along which a head of a railroad spike is to slide when the first wear plate is coupled to the first wall and a shank of the railroad spike travels through a channel. The example disclosed set of wear plates also includes a second wear plate configured to removably couple to a second sloped surface of a second wall of the tray head. The second wear plate defines a second sloped wear edge along which the head of the railroad spike is to slide when the second wear plate is coupled to the second wall and the shank of the railroad spike travels through the channel. When coupled to the first and second walls, respectively, the first and second wear plates are configured to be parallel to and spaced apart from each other to at least partially define the channel.

In some examples, when coupled to the first wall and the second wall, respectively, at least one of the first sloped wear edge and the second sloped wear edge is configured to engage the head of the railroad spike to prevent the railroad spike from falling through the channel.

In some examples, the first and second wear plates are case hardened. In some such examples, the first and second wear plates include ferritic-nitrocarburized case-hardened steel.

In some examples, the first and second wear plates define through holes through which threaded fasteners are to extend to couple the first wear plate to the first wall and the second wear plate to the second wall. In some such examples, the first and second wear plates define counterbore holes that are concentrically aligned with the through holes and extend from respective upper surfaces of the first and second wear plates to deter the threaded fasteners from extending beyond the upper surface of the first wear plate when coupled to the first wall and the upper surface of the second wear plate when coupled to the second wall. In some such examples, the through holes are located adjacent to outer edges opposite the first and second sloped wear edges to deter the through holes from affecting movement of the head of the railroad spike along the first sloped wear edge and the second sloped wear edge.

In some examples, each of the first sloped wear edge and the second sloped wear edge is concave. In some such examples, each of the first sloped wear edge and the second sloped wear edge includes at least one obtuse angle.

In some examples, the first wear plate and the second wear plate are asymmetrical with respect to each other. In some such examples, the first sloped wear edge is longer than the second sloped wear edge. In some such examples, the first wear plate includes a shelf. The shelf is configured to extend beyond the second sloped wear edge and provide a surface on which the head of the railroad spike is to rest prior to ejection from the tray head. In some such examples, an end of the second wear plate has a greater height than a corresponding end of the first wear plate.

An example disclosed detachable wear plate for a tray head of a railroad spike dispenser includes a body. The body defines a lower surface configured to couple to a sloped surface of a wall of the tray head. The body also defines a sloped wear edge along which a head of a railroad spike is to slide when the lower surface is coupled to the wall and a shank of the railroad spike travels through a channel partially defined by the wall. The sloped edge is spaced apart from the lower surface.

In some examples, when coupled to the wall, the sloped wear edge is configured to engage the head of the railroad spike to prevent the railroad spike from falling through the channel.

In some examples, the body is case hardened. In some such examples, the body includes ferritic-nitrocarburized case-hardened steel.

In some examples, the body defines through holes through which threaded fasteners are to extend to couple the body to the wall. In some such examples, the body defines the through holes are counterbore holes that are concentrically aligned with the through holes and extend from an upper surface to deter the threaded fasteners from extending beyond the upper surface when coupled to the wall. In some such examples, the through holes are located along an outer edge opposite the sloped wear edge to deter the through holes from affecting movement of the head of the railroad spike along the sloped wear edge.

In some examples, the sloped wear edge is concave. In some examples, the sloped wear edge includes at least one obtuse angle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
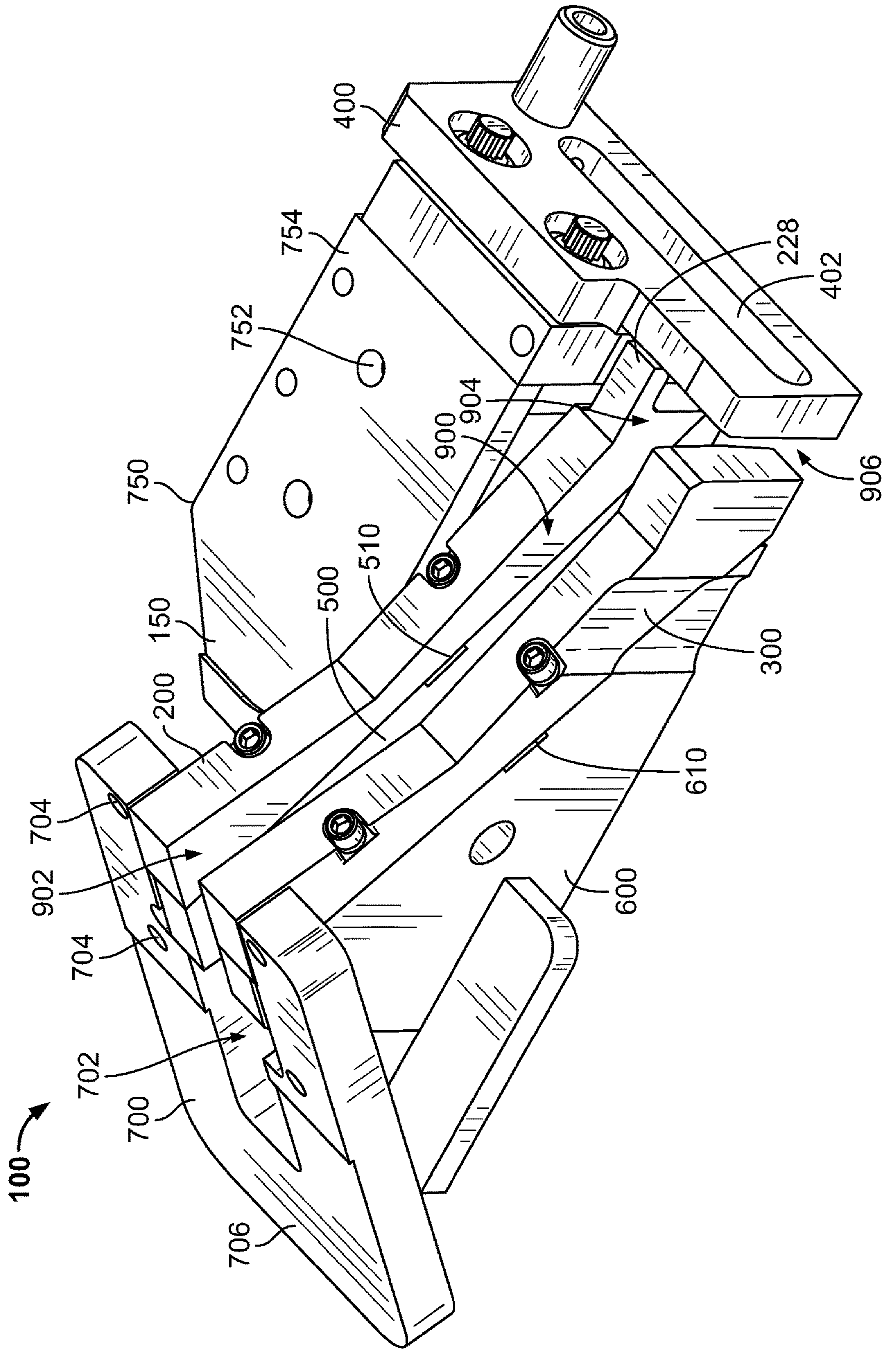
FIGS. 1-17 depict a plurality of views of an example tray head for a railroad spike dispenser when assembled in accordance with the teachings herein.
Figure 2:
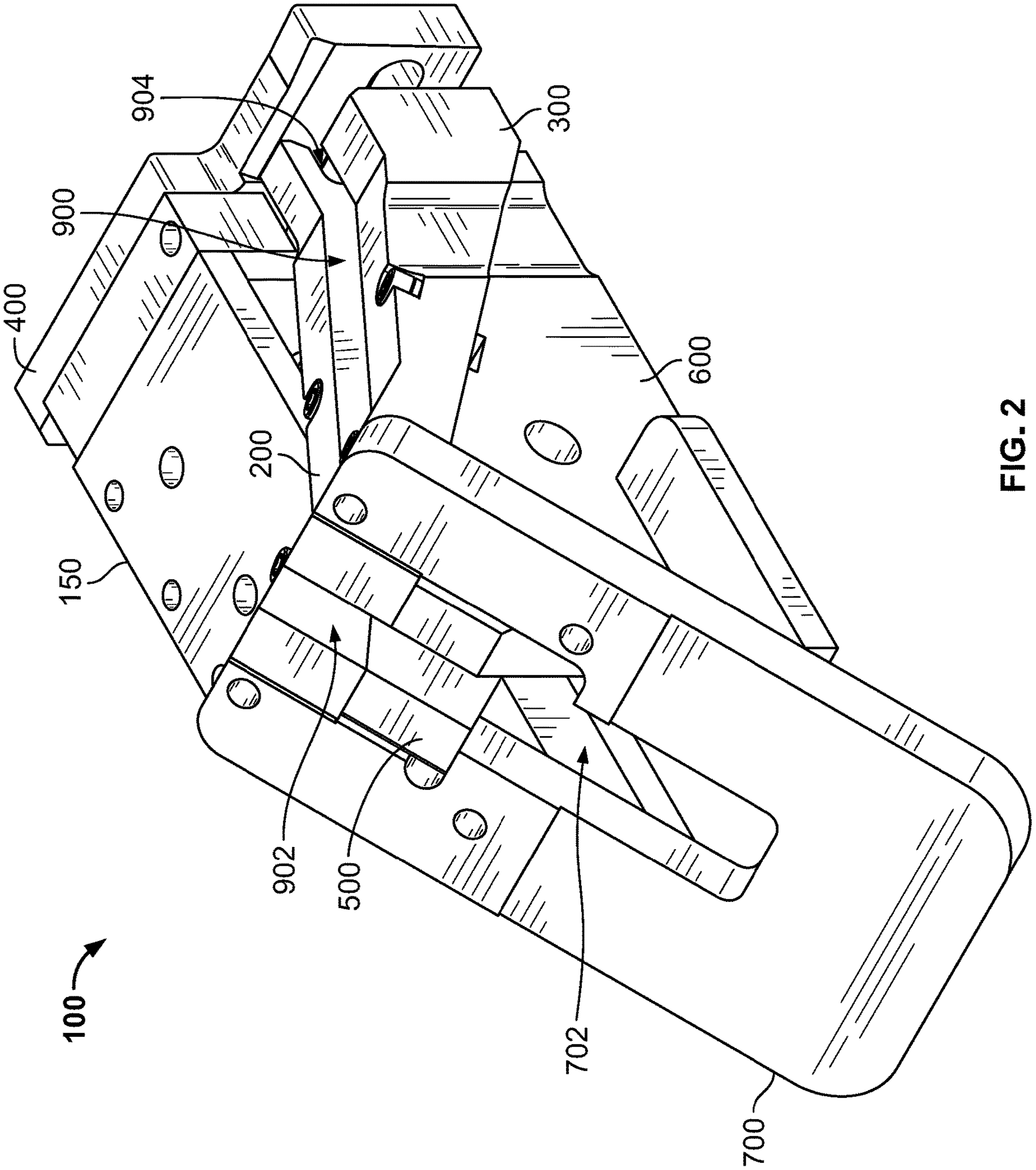
Figure 3:
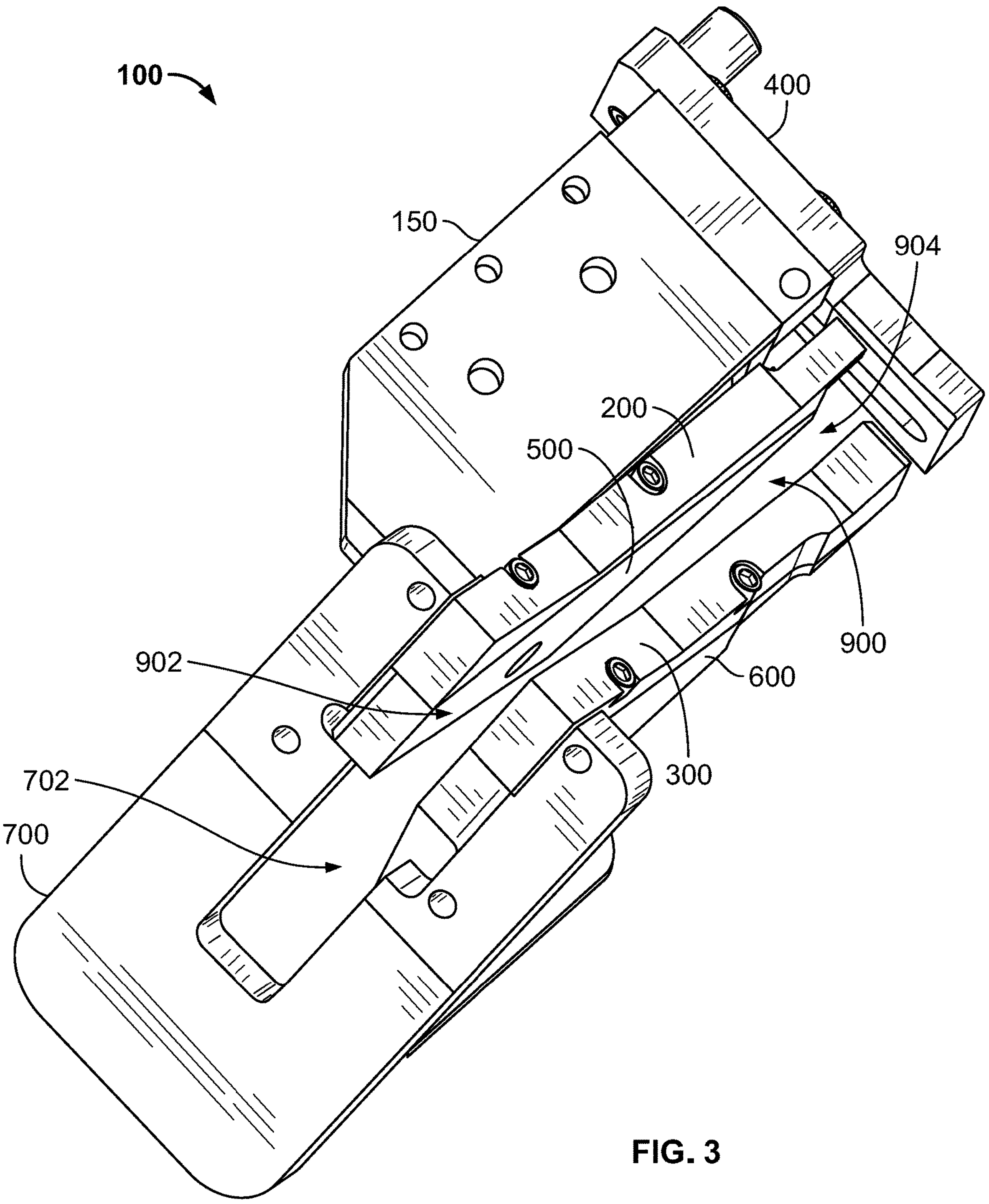
Figure 4:
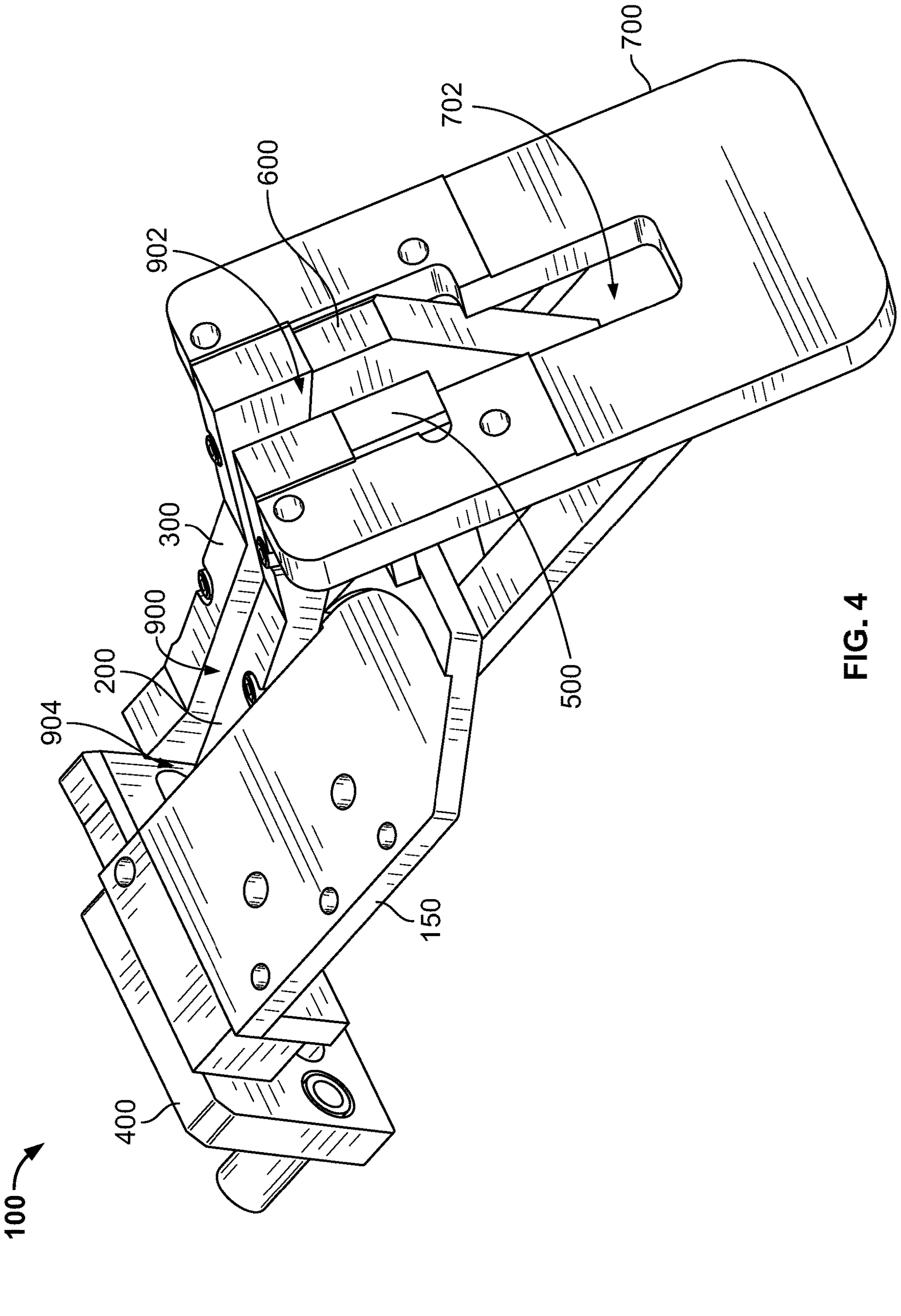
Figure 5:
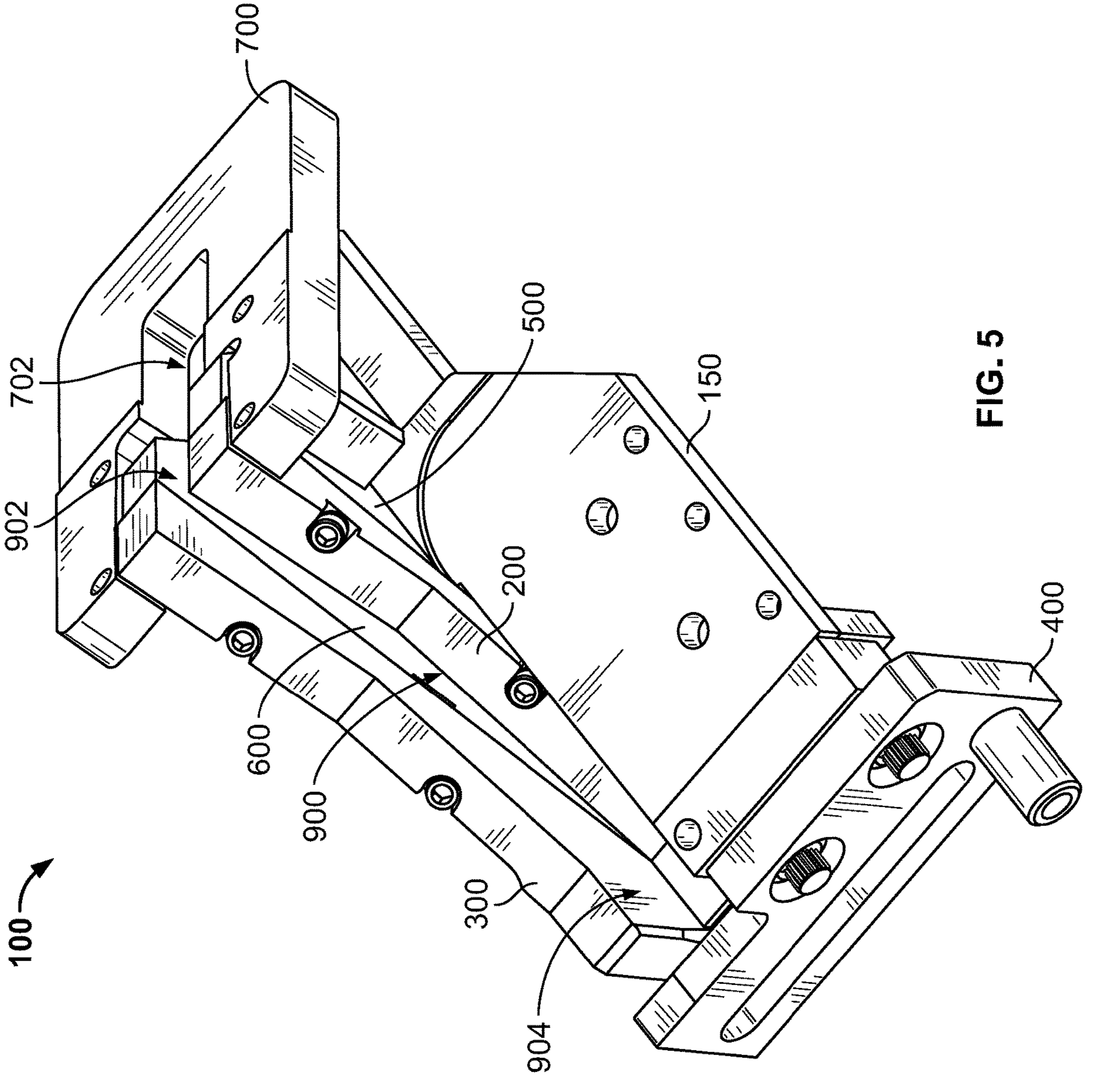
Figure 6:
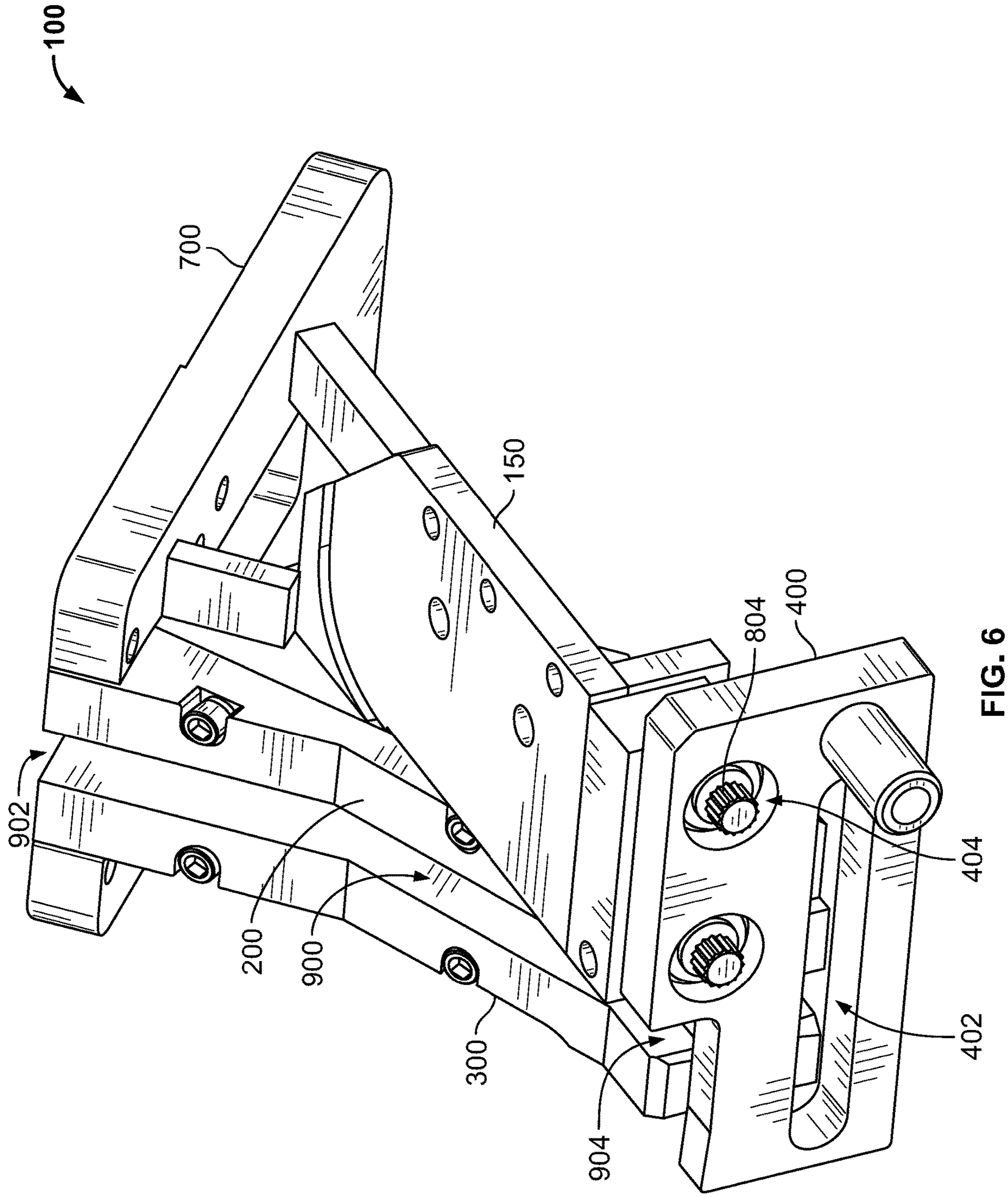
Figure 7:
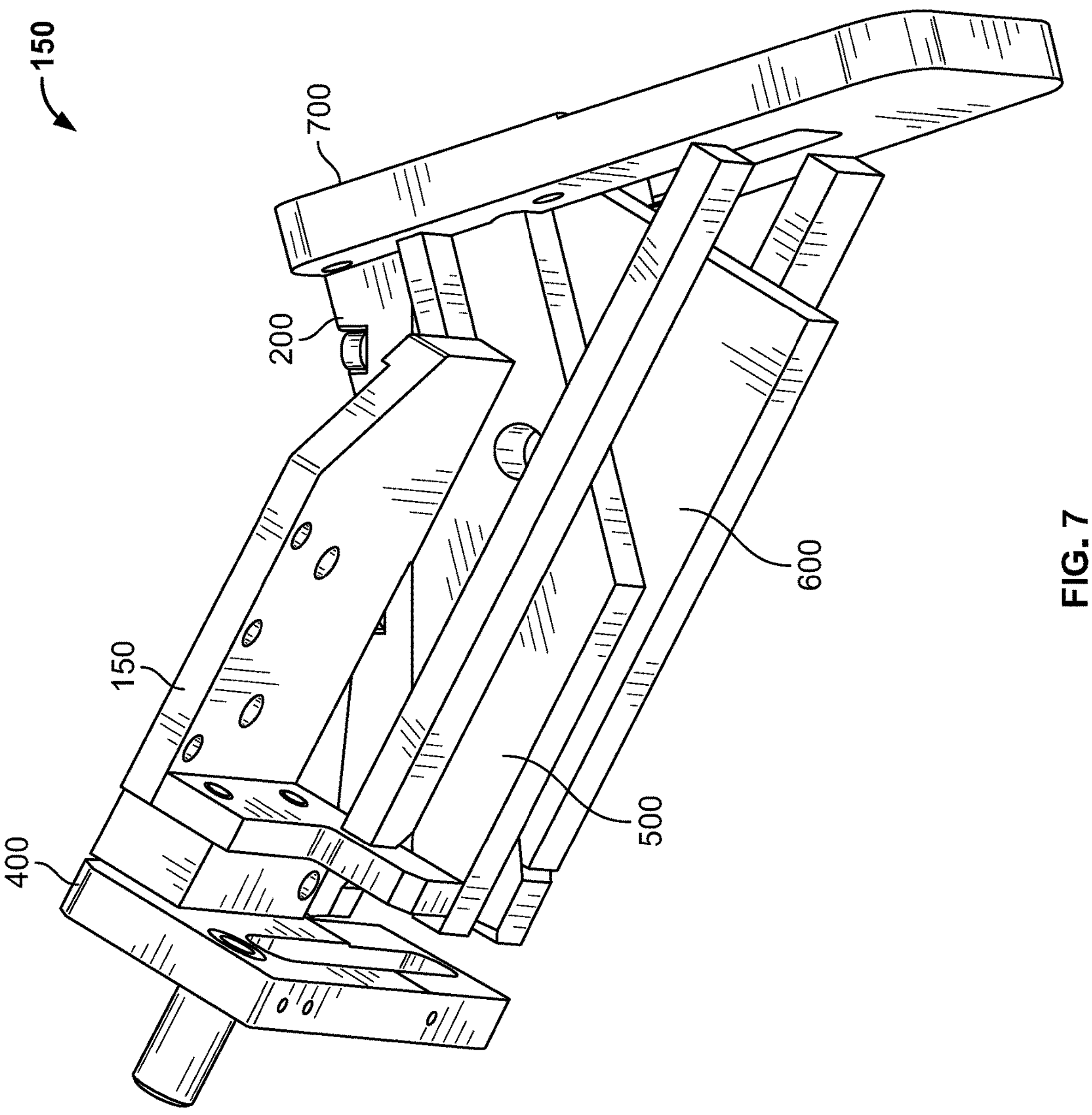
Figure 8:
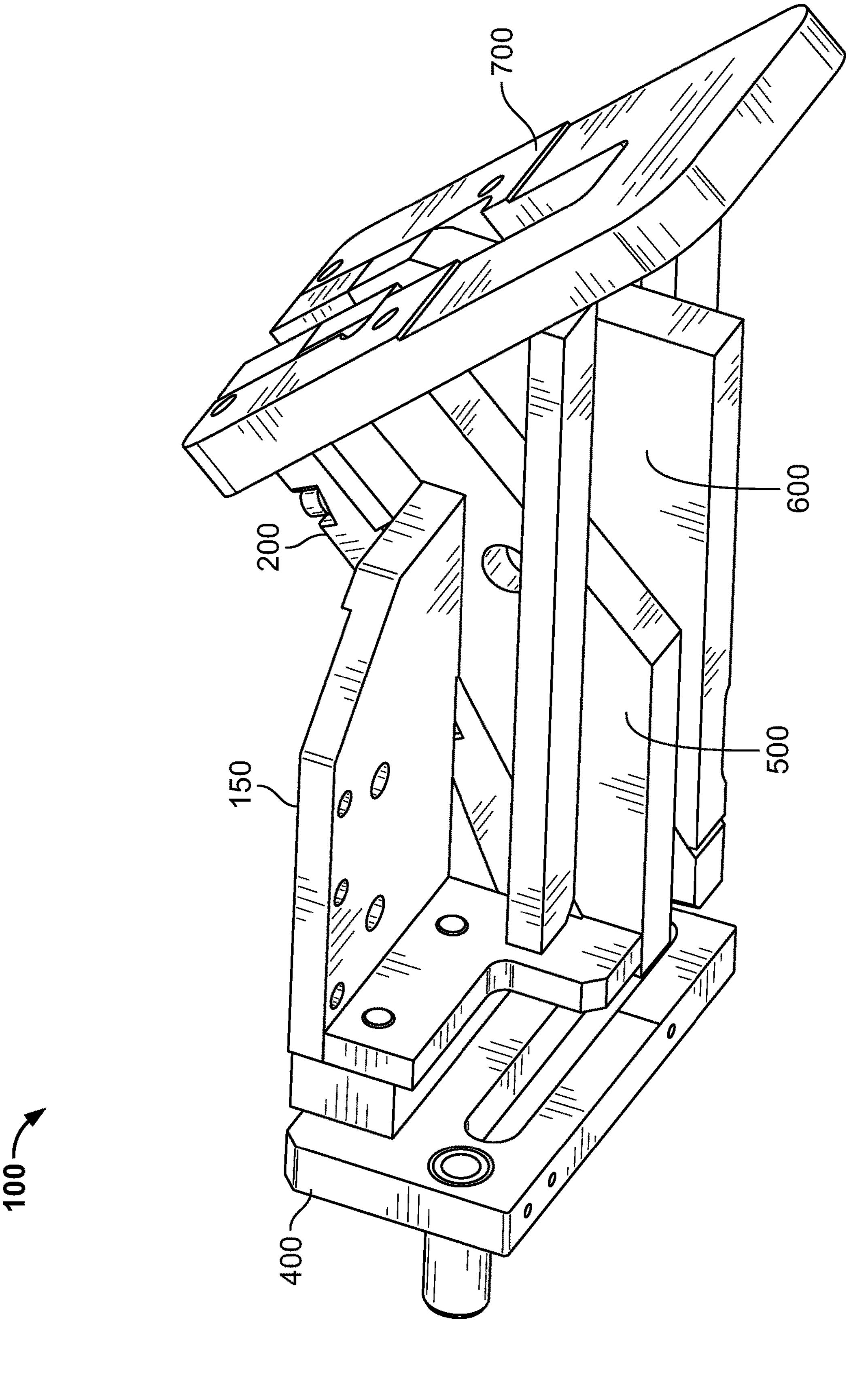
Figure 9:
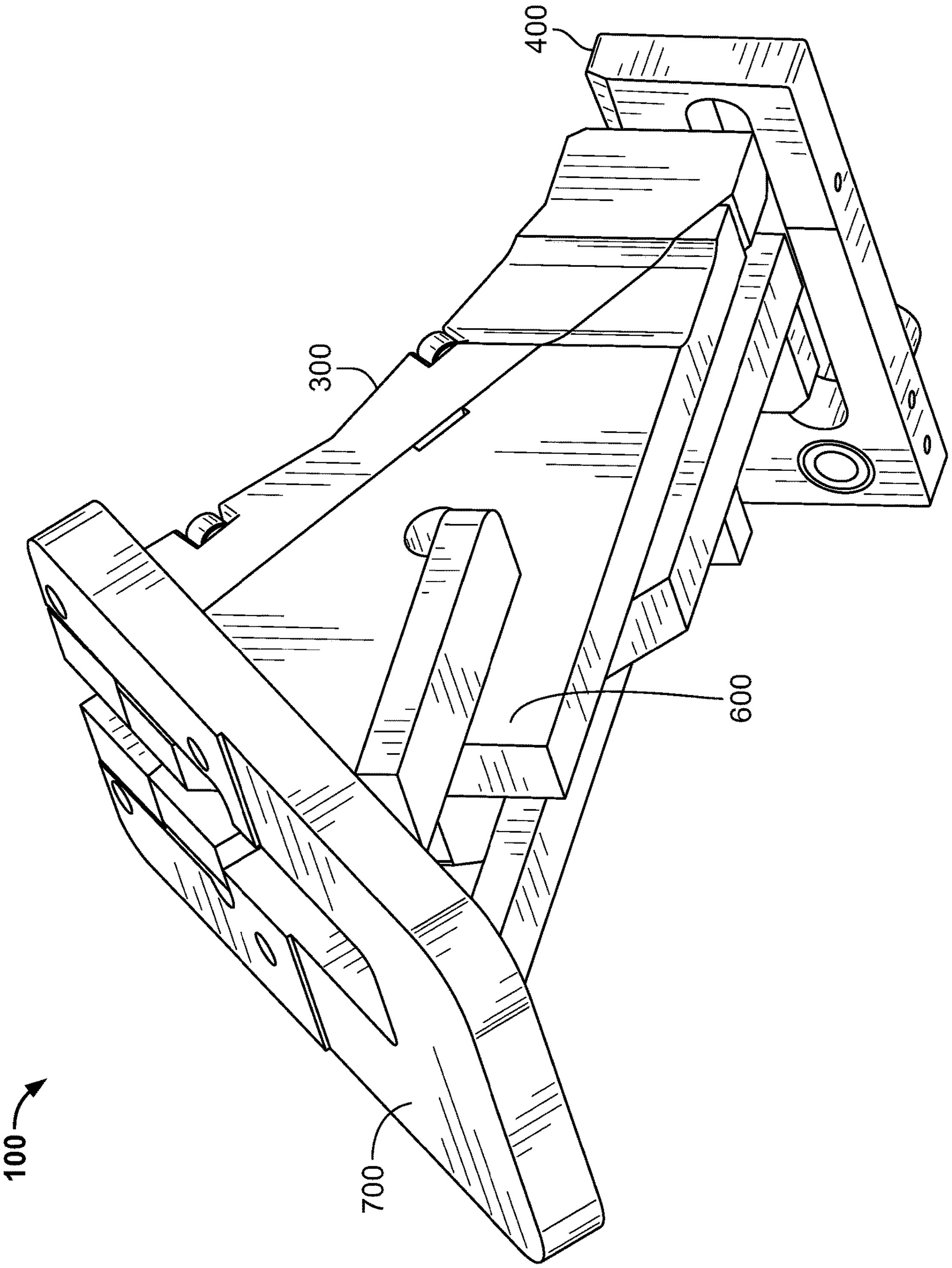
Figure 10:
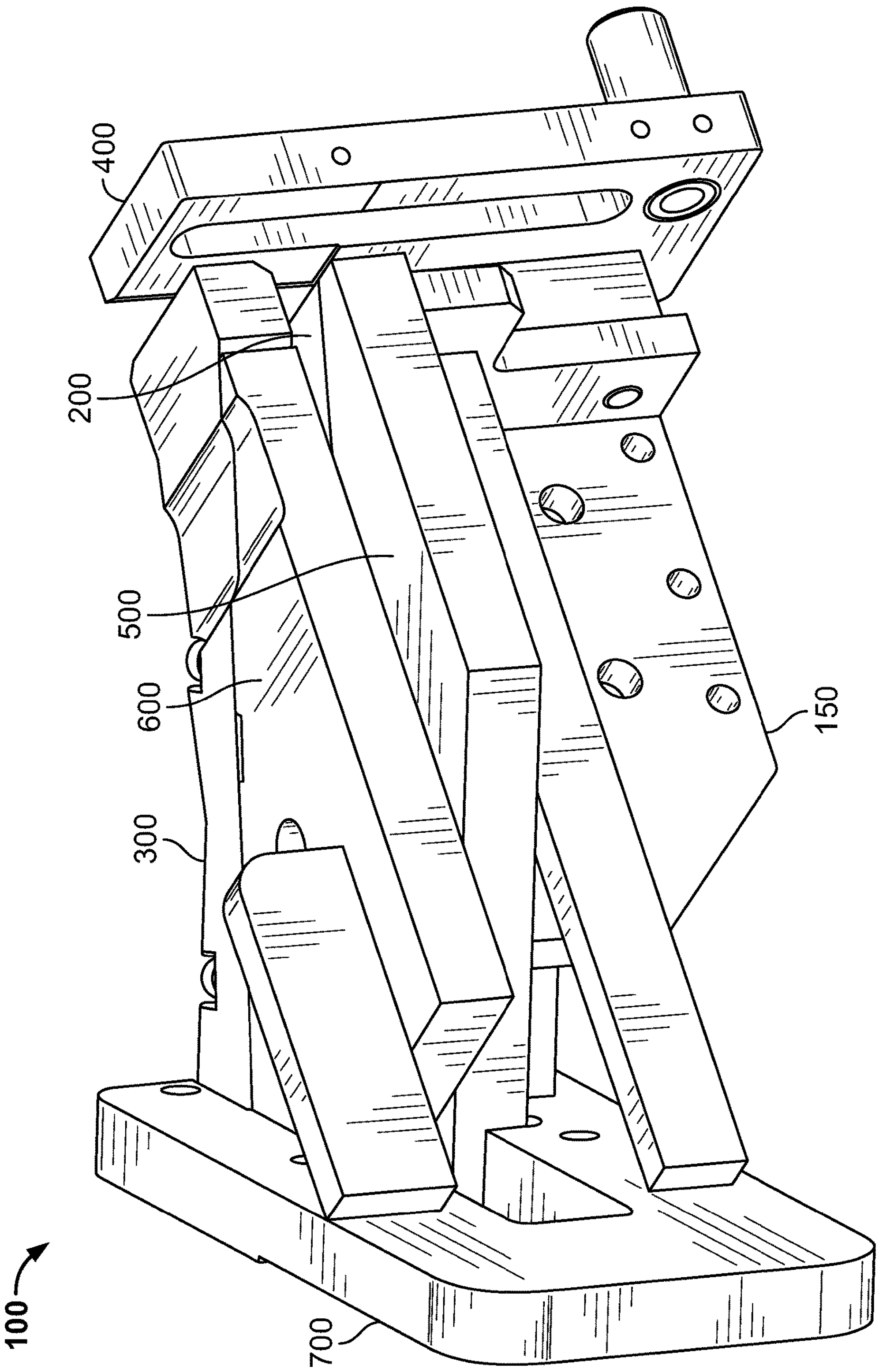
Figure 11:
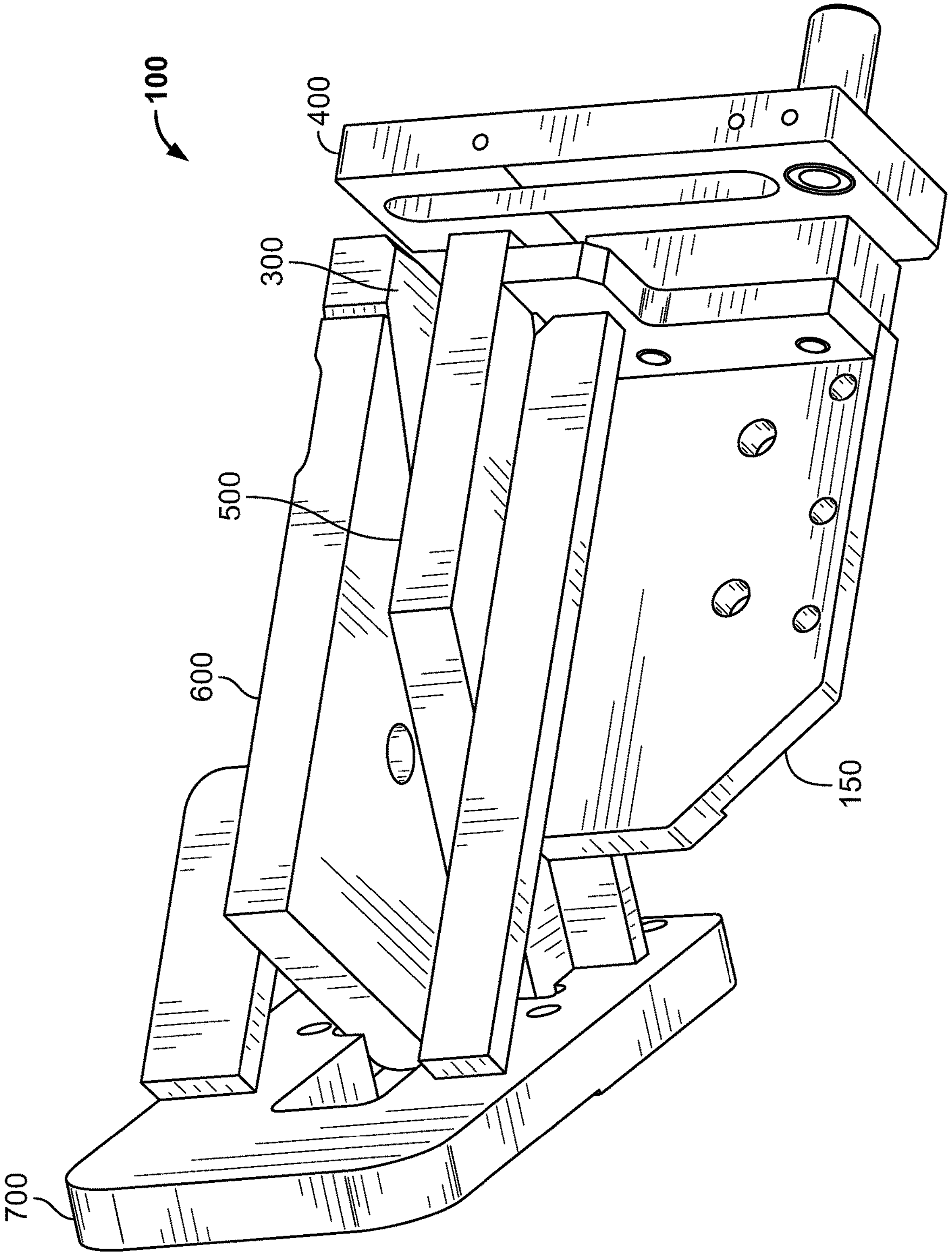
Figure 12:
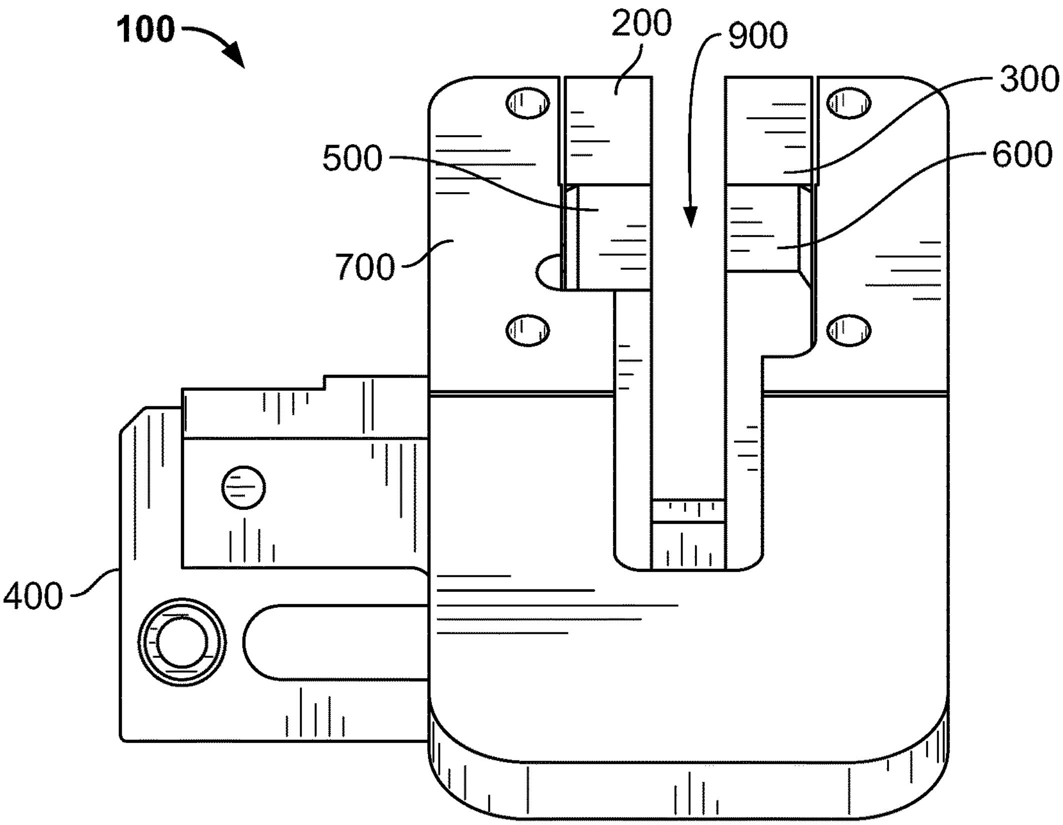
Figure 13:
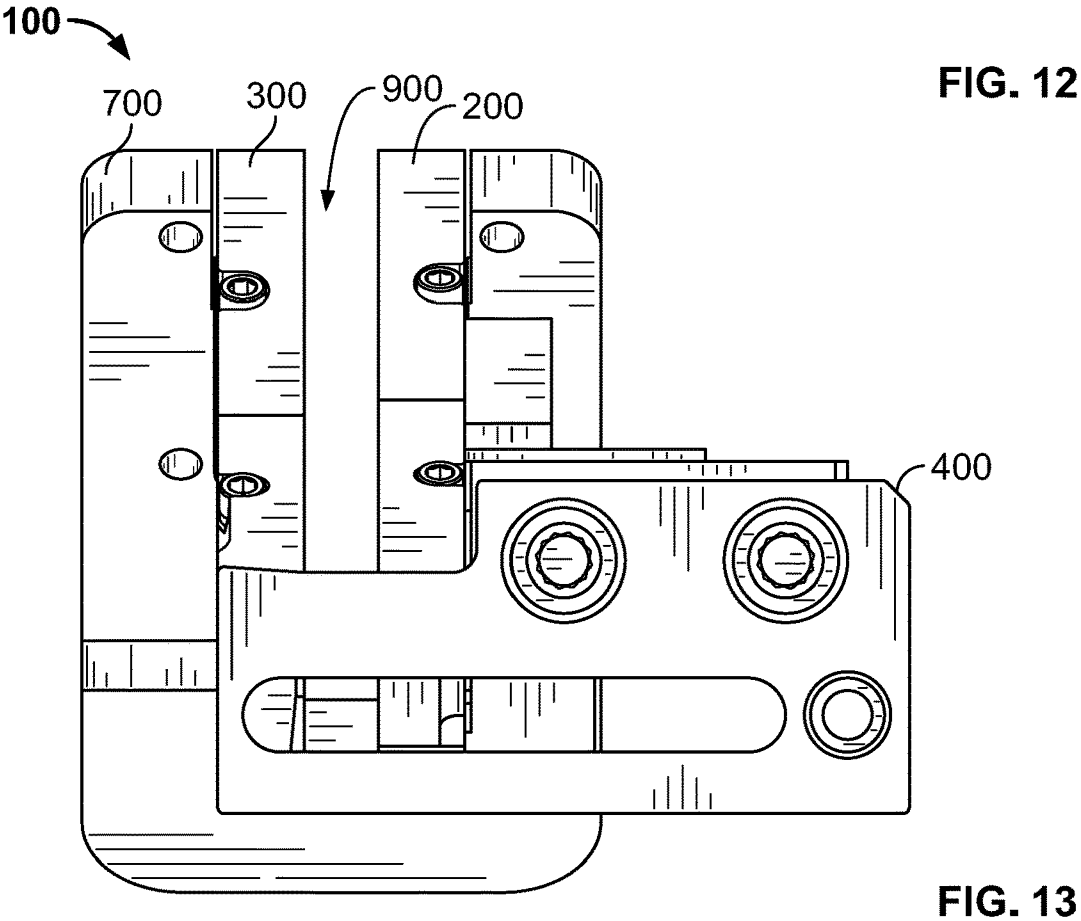

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Example apparatus disclosed herein include detachable wear plates that are removably coupled to a body of a tray head. The tray head of examples disclosed herein is configured such that railroad spikes slide along the wear plates when being fed to the device that drives the railroad spikes into the ground. The wear plates are case hardened to increase durability of portions of the tray head along which railroad spikes slide along. Further, the body of the tray head is formed from rigid and weldable material that is not case hardened. The wear plates are case-hardened to increase the durability of the tray head, while the body is not case-hardened to reduce the manufacturing costs of the tray head. Further, the wear plates are configured to be replaced while the body of the tray head remains coupled to a workhead to reduce maintenance time associated with the tray head. Additionally, because the wear plates are able to be replaced without replacing the body, maintenance costs associated with the tray head are reduced.

Figure 18:
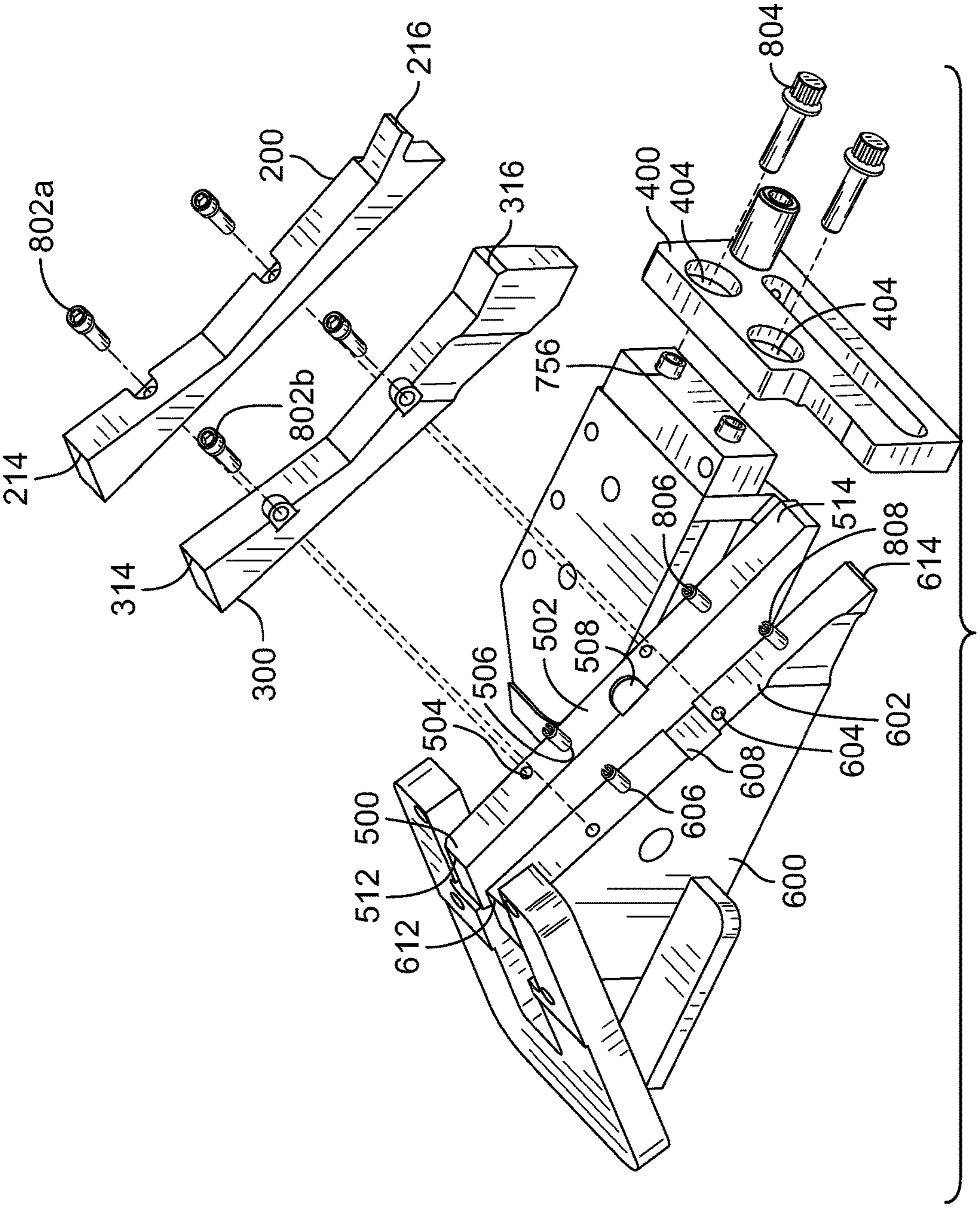
FIG. 18 depicts an exploded view of components of the tray head of FIGS. 1-17.

Turning to the figures, FIGS. 1-18 illustrate an example tray head 100 of a spike dispenser for a railroad in accordance with the teachings herein. More specifically, FIGS. 1-17 depict a plurality of views of the tray head 100 in an assembled state. FIG. 18 depicts an exploded view of components of the tray head 100. The tray head 100 of the illustrated example is a left-hand tray head that is configured to distribute spikes for a left-hand rail of a railroad. Additionally, a right-hand tray, which that is configured to distribute spikes for a right-hand rail of a railroad, is in accordance with the teachings herein. For examples disclosed herein, a right-hand tray is a mirror image of a corresponding left-hand tray. As such, components of a right-hand tray are identical to those of a corresponding left-hand tray, except for being in a mirrored configuration.

Turning to FIGS. 1-17, the tray head 100 of the illustrated example includes a body 150, a wear plate 200 (sometimes referred to as a first wear plate), a wear plate 300 (sometimes referred to as a second wear plate), and a guide support 400. Further, the body 150 of the tray head 100 includes a wall 500 (sometimes referred to as a first wall), a wall 600 (sometimes referred to as a second wall), a flange 700, and a base 750. In the illustrated example, the flange 700 connects the wall 500 and the wall 600, and the base 750 is connected to the wall 500. When tray head 100 is assembled, the wear plate 200 is detachably coupled to the wall 500 and the wear plate 300 is detachably coupled to the wall 600. For example, the wear plate 200 is coupled to the wall 500 and the wear plate 300 is coupled to the wall 600 via fasteners 802. Further, the guide support 400 is detachably coupled to the base 750, for example, via fasteners 804.

Figure 20:
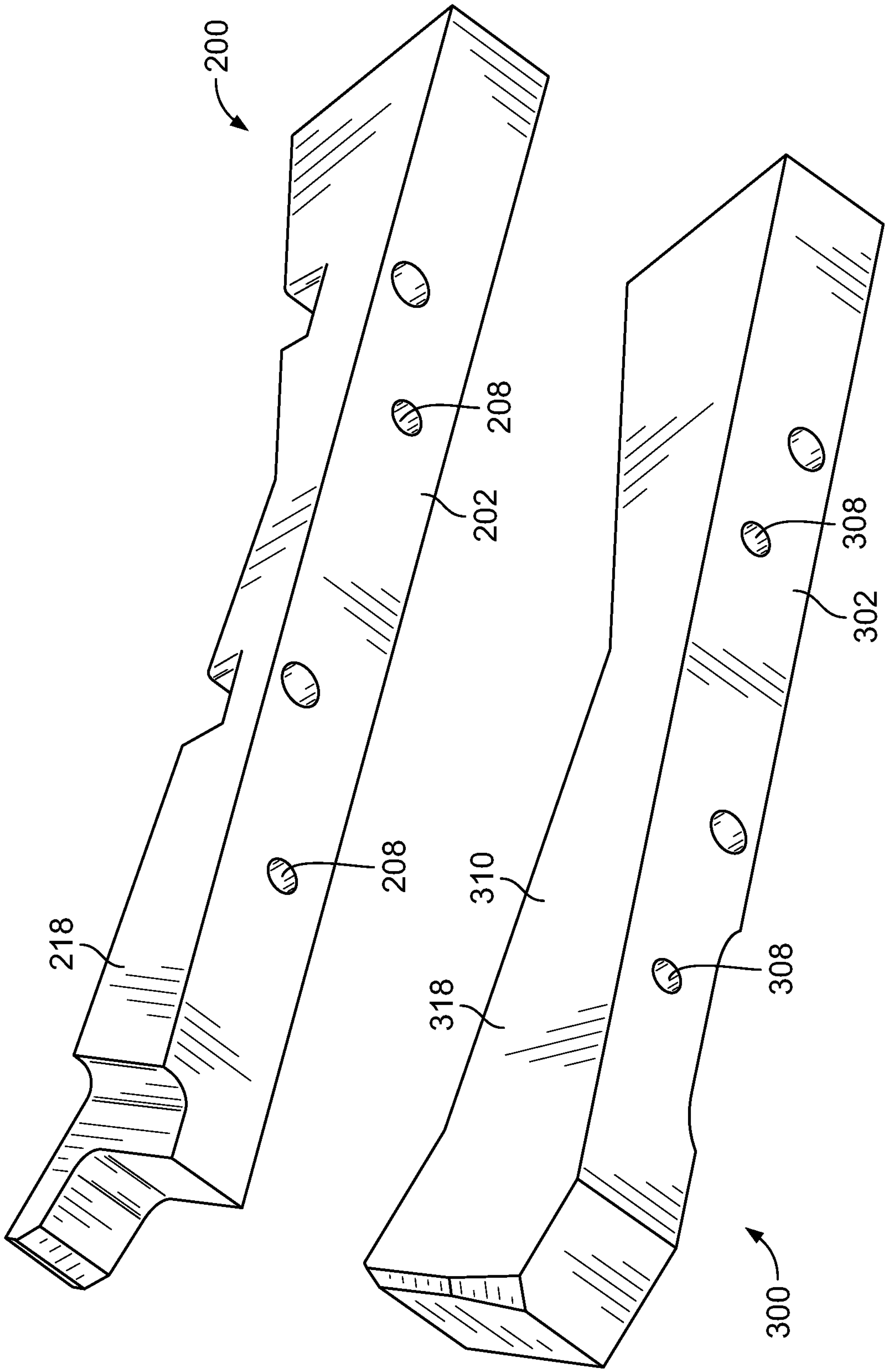

Turning to FIG. 18, the wall 500 defines a sloped surface 502 (sometimes referred to as a first sloped surface) to which the wear plate 200 is configured to couple. For example, the wear plate 200 defines a lower surface 202 (sometimes referred to as a first lower surface) that is configured to engage the sloped surface 502 of the wall 500 when the wear plate 200 is coupled to the wall 500. The lower surface 202, as illustrated in FIG. 20, is sloped to enable the lower surface 202 to mate to the sloped surface 502. Returning to FIG. 18, the wear plate 200 is removably coupled to the wall 500 via fasteners **802*a* of the fasteners 802. For example, the fasteners 802*a* (sometimes referred to as first fasteners) are threaded fasteners that are configured to extend through respective through holes 204 (sometimes referred to as first through holes) of the wear plate 200 and to be threadably received by threaded holes 504 (sometimes referred to as first threaded holes) to couple the wear plate 200 to the wall 500. The wear plate 200 defines the through holes 204 that extend between the lower surface 202 and an upper surface 206 (sometimes referred to as a first upper surface) of the wear plate 200. The threaded holes 504 defined by the wall 500 are located along the sloped surface 502 of the wall 500. Further, the through holes 204 defined by the wear plate 200 and the threaded holes 504 defined by the wall 500 align with each other to enable the fasteners 802*a* to couple the wear plate 200 to the wall 500**.

The tray head 100 of the illustrated example also includes pins 806 (sometimes referred to as first pins) that facilitate alignment of the wear plate 200 with the sloped surface 502 of the wall 500. In the illustrated example, the pins 806 (e.g., roll pins, dowel pins, etc.) are snugly inserted into pin holes 506 defined by the wall 500 along the sloped surface 502 such that ends of the pins 806 protrude from the pin holes 506. As illustrated in FIG. 20, the wear plate 200 defines pin holes 208 that are configured to receive the protruding ends of the pins 806 to align the wear plate 200 with the sloped surface 502 of the wall 500. That is, the pins 806 are configured to guide the wear plate 200 in being coupled to the wall 500. In other examples, the pins 806 are snugly inserted into pin holes 208 of the wear plate 200 and are received by the pin holes 506 of the wall 500 to align the wear plate 200 with the sloped surface 502 of the wall 500.

Further, the wear plate 200 is configured to be easily decoupled from the sloped surface 502 of the wall 500 by an operator without damaging the wall 500. To detach the wear plate 200 from the sloped surface 502 of the wall 500, the fasteners **802*a* are removed from the threaded holes 504 of the wall 500. In the illustrated example, the wall 500 defines a groove 508 (sometimes referred to as a first groove) on the sloped surface 502. As illustrated in FIG. 1, a slot 510 is formed by the groove 508 when the wear plate 200 is coupled to the sloped surface 502 of the wall 500. The slot 510 is configured to receive a flat tool-head (e.g., a head of a flathead screwdriver) to enable the wear plate 200 to be pried from the sloped surface 502 of the wall 500 after the fasteners 802*a* are removed from the threaded holes 504**.

Returning to FIG. 18, the wall 600 defines a sloped surface 602 (sometimes referred to as a second sloped surface) to which the wear plate 300 is configured to couple. For example, the wear plate 300 defines a lower surface 302 (sometimes referred to as a second lower surface) that is configured to engage the sloped surface 602 of the wall 600 when the wear plate 300 is coupled to the wall 600. The lower surface 302, as illustrated in FIG. 20, is sloped to enable the lower surface 302 to mate to the sloped surface 602. Returning to FIG. 18, the wear plate 300 is removably coupled to the wall 600 via fasteners **802*b* of the fasteners 802. For example, the fasteners 802*b* (sometimes referred to as second fasteners) are threaded fasteners that are configured to extend through respective through holes 304 (sometimes referred to as second through holes) of the wear plate 300 and to be threadably received by threaded holes 604 (sometimes referred to as second threaded holes) to couple the wear plate 300 to the wall 600. The wear plate 300 defines the through holes 304 that extend between the lower surface 302 and an upper surface 306 (sometimes referred to as a second upper surface) of the wear plate 300. The threaded holes 604 defined by the wall 600 are located along the sloped surface 602 of the wall 600. Further, the through holes 304 defined by the wear plate 300 and the threaded holes 604 defined by the wall 600 align with each other to enable the fasteners 802*b* to couple the wear plate 300 to the wall 600**.

The tray head 100 of the illustrated example includes pins 808 (sometimes referred to as second pins) that facilitate alignment of the wear plate 300 with the sloped surface 602 of the wall 600. In the illustrated example, the pins 808 (e.g., roll pins, dowel pins, etc.) are snugly inserted into pin holes 606 defined by the wall 600 along the sloped surface 602 such that ends of the pins 808 protrude from the pin holes 606. As illustrated in FIG. 20, the wear plate 300 defines pin holes 308 that are configured to receive the protruding ends of the pins 808 to align the wear plate 300 with the sloped surface 602 of the wall 600. That is, the pins 808 are configured to guide the wear plate 300 in being coupled to the wall 600. In other examples, the pins 808 are snugly inserted into pin holes 308 of the wear plate 300 and are received by the pin holes 606 of the wall 600 to align the wear plate 300 with the sloped surface 602 of the wall 600.

The wear plate 300 also is configured to be easily decoupled from the sloped surface 602 of the wall 600 by an operator without damaging the wall 600. To detach the wear plate 300 from the sloped surface 602 of the wall 600, the fasteners **802*b* are removed from the threaded holes 604 of the wall 600. In the illustrated example, the wall 600 defines a groove 608 (sometimes referred to as a first groove) on the sloped surface 602. As illustrated in FIG. 1, a slot 610 is formed by the groove 608 when the wear plate 300 is coupled to the sloped surface 602 of the wall 600. The slot 610 is configured to receive a flat tool-head (e.g., a head of a flathead screwdriver) to enable the wear plate 300 to be pried from the sloped surface 602 of the wall 600 after the fasteners 802*b* are removed from the threaded holes 604**.

Returning to FIGS. 1-17, the walls 500, 600 of the illustrated example are parallel to and spaced apart from each other. When the wear plates 200, 300 are coupled to the walls 500, 600, respectively, the wear plates 200, 300 also are parallel to and spaced apart from each other. The walls 500, 600 and the wear plates 200, 300 are configured in such an arrangement to define a channel 900 through which shanks of railroad spikes are configured to travel. Further, the walls 500, 600 and the wear plates 200, 300 define an inlet 902 of the channel 900 that is configured to receive the shanks of the railroad spikes from a spike tray. Further, as illustrated in FIGS. 1-5 and 12, the flange 700 defines a slot 702 that is adjacent to the inlet 902 to prevent the flange 700 from blocking railroad spikes from entering the inlet 902 of the channel 900. Additionally, the walls 500, 600 and the wear plates 200, 300 define an outlet 904 of the channel 900 that is configured to feed the shanks of the railroad spikes into an actuating device (e.g., a jaw) that drives the railroad spikes into the ground. That is, each of the wall 500, the wall 600, the wear plate 200, and the wear plate 300 at least partially defines the inlet 902, the outlet 904, and the channel 900 through which the shanks of the railroad spikes travel.

During operation, the tray head 100 is coupled to a spike driving workhead of the spike dispenser. In the illustrated example, the flange 700 is configured to couple to the spike dispenser. For example, the flange 700 defines apertures 704 that are located along a face 706 of the flange 700. Fasteners (e.g., threaded fasteners) are configured to extend through and/or into the apertures 704 to couple the flange 700 to the spike driving workhead. Additionally or alternatively, the base 750 of the tray head 100 is configured to couple to another portion of the spike dispenser. For example, the base 750 defines apertures 752 that are located along a face 754 of the base 750. Fasteners (e.g., threaded fasteners) are configured to extend through and/or into the apertures 752 to couple the base 750 to the spike driving workhead.

When the tray head 100 is coupled to the spike driving workhead, the tray head 100 enables a stream of railroad spikes (e.g., rail spikes, dog spikes, screw spikes, etc.) to flow, in an orderly manner, from the spike tray to the actuating device that is to drive the railroad spikes into the ground. Typically, a railroad spike includes a shank and a head at an end of the shank. The tray head 100, when coupled to the spike driving workhead, is positioned such that shanks of respective railroad spikes are fed from the spike tray and into the channel 900 of the tray head 100. For example, the shanks of railroad spikes (1) slide into the channel 900 through the inlet 902, (2) travel through the channel 900 between the inlet 902 and the outlet 904, and (3) exit the channel 900 through the outlet 904.

While the shanks of railroad spikes travel through the channel 900, the respective heads of the railroad spikes slide along the wear plates 200, 300. For example, the wear plate 200 defines an inner surface 210 (sometimes referred to as a first inner surface), the upper surface 206, and a wear edge 212 (sometimes referred to as a sloped wear edge, a first wear edge, or a first sloped wear edge) that is formed between the inner surface 210 and the upper surface 206. The inner surface 210, the upper surface 206, and the wear edge 212 are configured to engage a portion of the head of a railroad spike as the respective shank travels through the channel 900. That is, the head of a railroad spike is configured to slide along the inner surface 210, the upper surface 206, and/or the wear edge 212 of the wear plate 200 as the respective shank travels through the channel 900. Further, in some examples, the head of a railroad spike is configured to rest on the upper surface 206 and/or the wear edge 212 of the wear plate 200 to prevent the railroad spike from falling through the channel 900 while positioned between the inlet 902 and the outlet 904. That is, the upper surface 206 and/or the wear edge 212 is configured to engage an underside of the head of a railroad spike to prevent the railroad spike from falling through the channel 900.

Additionally, the wear plate 300 of the illustrated example includes an inner surface 310 (sometimes referred to as a second inner surface), the upper surface 306, and a wear edge 312 (sometimes referred to as a sloped wear edge, a second wear edge, or a second sloped wear edge) that is formed between the inner surface 310 and the upper surface 306. The inner surface 310, the upper surface 306, and the wear edge 312 are configured to engage a portion of the head of a railroad spike as the respective shank travels through the channel 900. That is, the head of a railroad spike is configured to slide along the inner surface 310, the upper surface 306, and/or the wear edge 312 of the wear plate 300 as the respective shank travels through the channel 900. Further, in some examples, the head of a railroad spike is configured to rest on the upper surface 306 and/or the wear edge 312 of the wear plate 300 to prevent the railroad spike from falling through the channel 900 while positioned between the inlet 902 and the outlet 904. That is, the upper surface 206 and/or the wear edge 212 is configured to engage an underside of the head of a railroad spike to prevent the railroad spike from falling through the channel 900.

In some instances, a continuous stream of railroad spikes are fed from the spike tray into the tray head 100. In turn, a plurality of railroad spikes hang from the wear plate 200 and/or the wear plate 300 and into the channel 900 in a single-file manner between the inlet 902 and the outlet 904. As one railroad spike exits the channel 900 through the outlet 904, each of the of railroad spikes within the channel 900 move one position closer to the outlet 904 and another railroad spike enters the channel 900 through the inlet 902.

To deter jamming or bending of the railroad spikes, each of the upper surface 206 of the wear plate 200 and the upper surface 306 of the wear plate 300 forms a slope to enable the railroad spikes to slide from the inlet 902 to the outlet 904 in an orderly manner. Further, if the railroad spikes do become jammed or bent within the channel 900, the flange 700 extends in a downward direction away from the sloped surfaces 502, 602 of the walls 500, 600 and the upper surfaces 206, 306 of the wear plate 200, 300 to provide access for an operator. For example, the configuration of the flange 700 enables an operator to unjam the railroad spikes by adjusting one or more railroad spikes within the channel 900 and/or removing a bent railroad spike from the channel 900. That is, the flange 700 is configured to protrude away from, instead of over, the channel 900 to enable an operator to unjam the tray head 100.

Once a railroad spike reaches the outlet 904 of the channel 900 of the tray head 100, an actuator drives the railroad spike to a device (e.g., a jaw) of the spike dispenser that drives the railroad spike into the ground. For example, upon reaching the outlet 904, a railroad spike is configured to rest on a shelf 228 of the wear plate 200 adjacent to the outlet 904. The guide support 400 and/or a retaining device (e.g., a hook) located below the guide support 400 are configured to further facilitate the railroad spike in remaining in place prior to being ejected from the tray head 100. The guide support 400 and the wear plate 300 also define a pathway 906 through which the railroad spikes are ejected from the tray head. An actuating device (e.g., a hydraulic single-acting actuator) that extends through a slot 402 defined by the guide support 400 is configured to actuate the railroad spike from the shelf 228 through the pathway 906 and, thus, eject the railroad spike from the tray head 100 to the actuating device that drives the railroad spike into the ground.

Overt an extending period of time, the guide support 400 may become worn down. Returning to FIG. 18, the guide support 400 is a detachable plate that is removably coupled to the base 750 of the body 150 of the tray head 100 to enable the guide support 400 to be removed and replaced with a new guide support. The guide support 400 is coupled to the base 750 via the fasteners 804. For example, the guide support 400 defines through holes 404 through which the fasteners 804 extend to couple the guide support 400 to the base 750. Further, the base 750 defines threaded holes 756 that threadably receive the fasteners 804 to couple the guide support 400 to the base 750.

Further, the walls 500, 600 and the wear plates 200, 300 define the slopes of the tray head 100 that facilitate the railroad spikes in sliding from the inlet 902 to the outlet 904. As illustrated in FIG. 18, the sloped surface 502 of the wall 500 includes an apex 512 that at least partially defines the inlet 902 of the channel 900 and a nadir 514 below the apex 512 that at least partially defines the outlet 904 of the channel 900. Further, the sloped surface 602 of the wall 600 includes an apex 612 that at least partially defines the inlet 902 and a nadir 614 below the apex 612 that at least partially defines the outlet 904. Additionally, the wear plate 200 is configured to couple to the sloped surface 502 of the wall 500 in such a manner that an apex 214 of the wear plate 200 at least partially defines the inlet 902 and a nadir 216 at least partially defines the outlet 904. Similarly, the wear plate 300 is configured to couple to the sloped surface 602 of the wall 600 in such a manner that an apex 314 of the wear plate 300 at least partially defines the inlet 902 and a nadir 316 at least partially defines the outlet 904.

Figure 14:
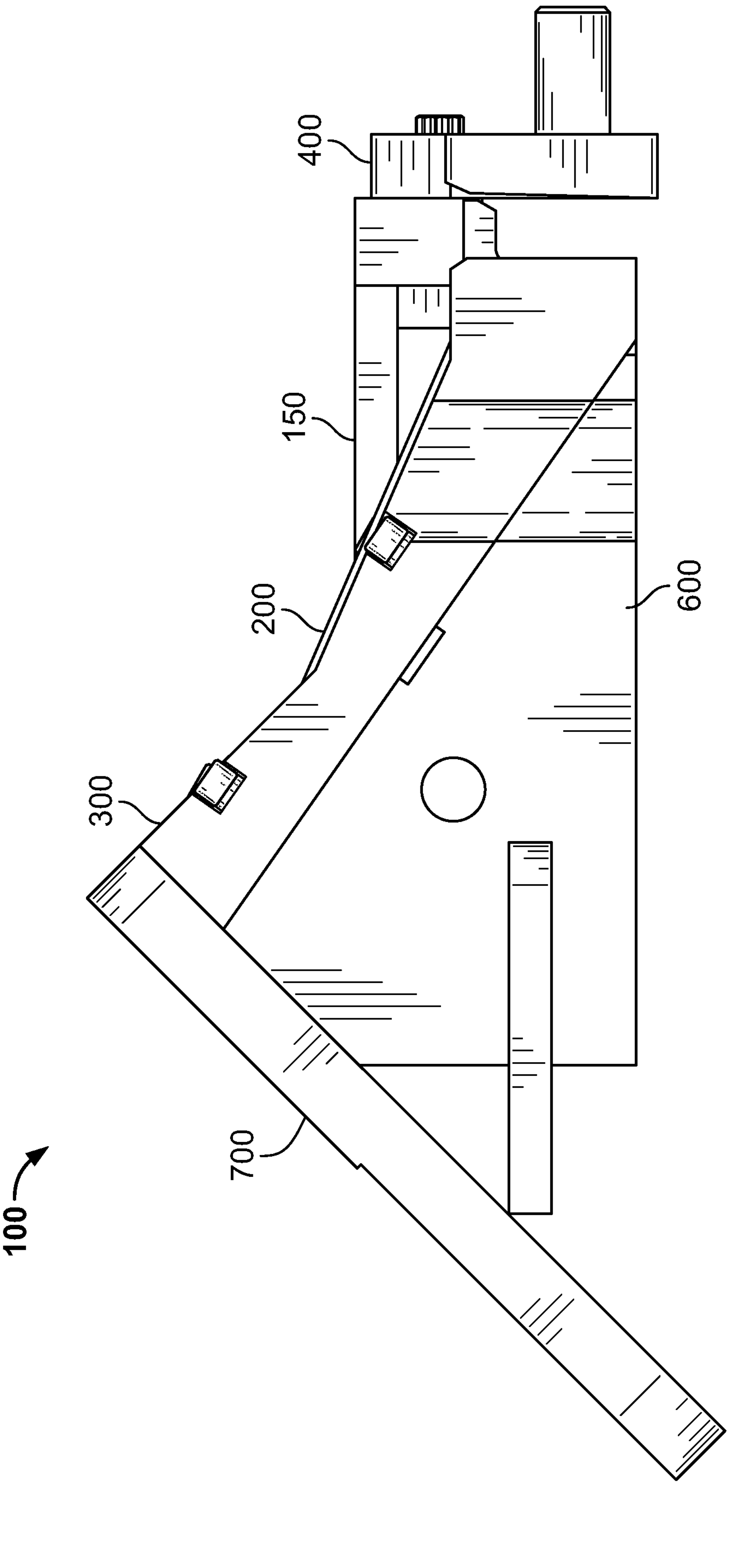
Figure 15:
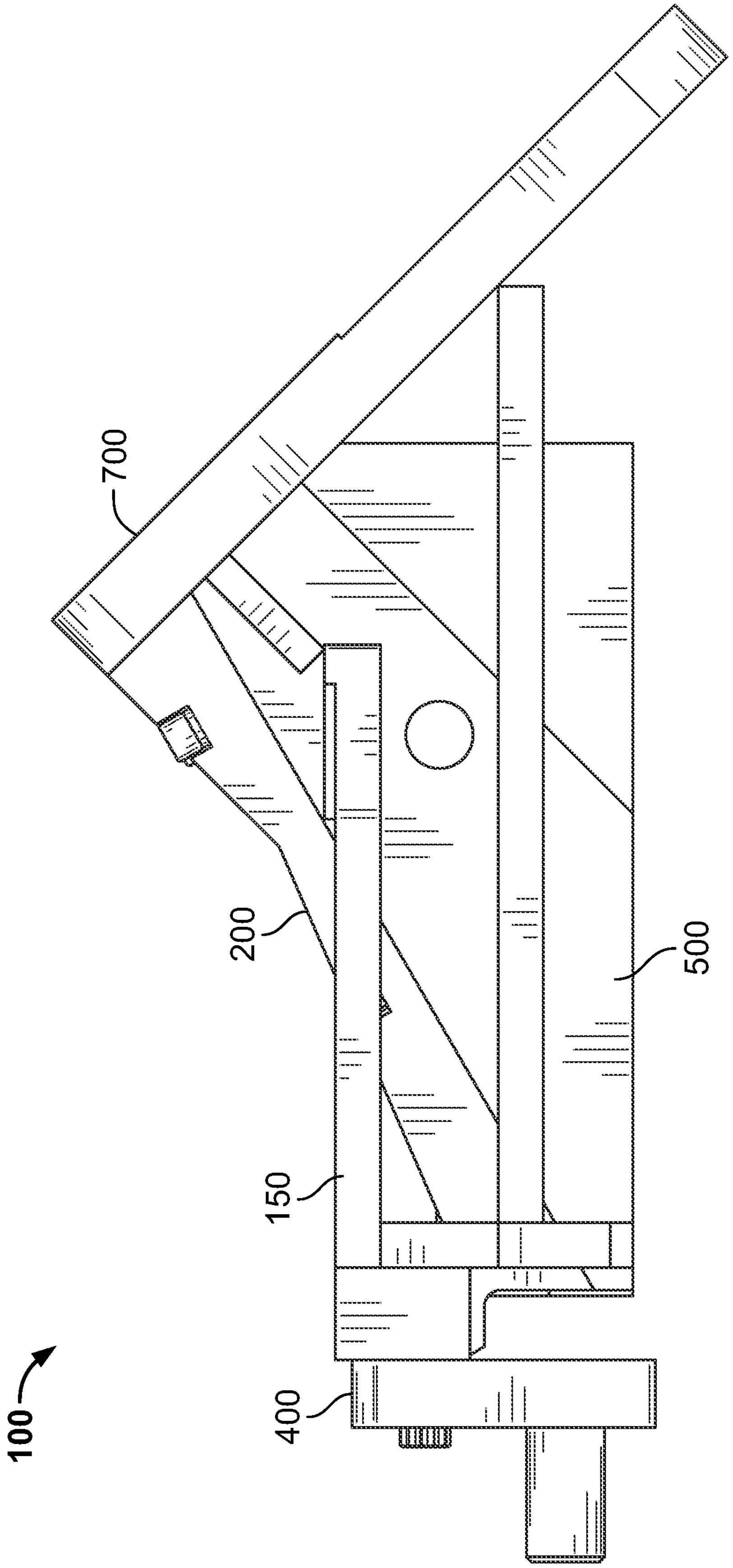
Figure 16:
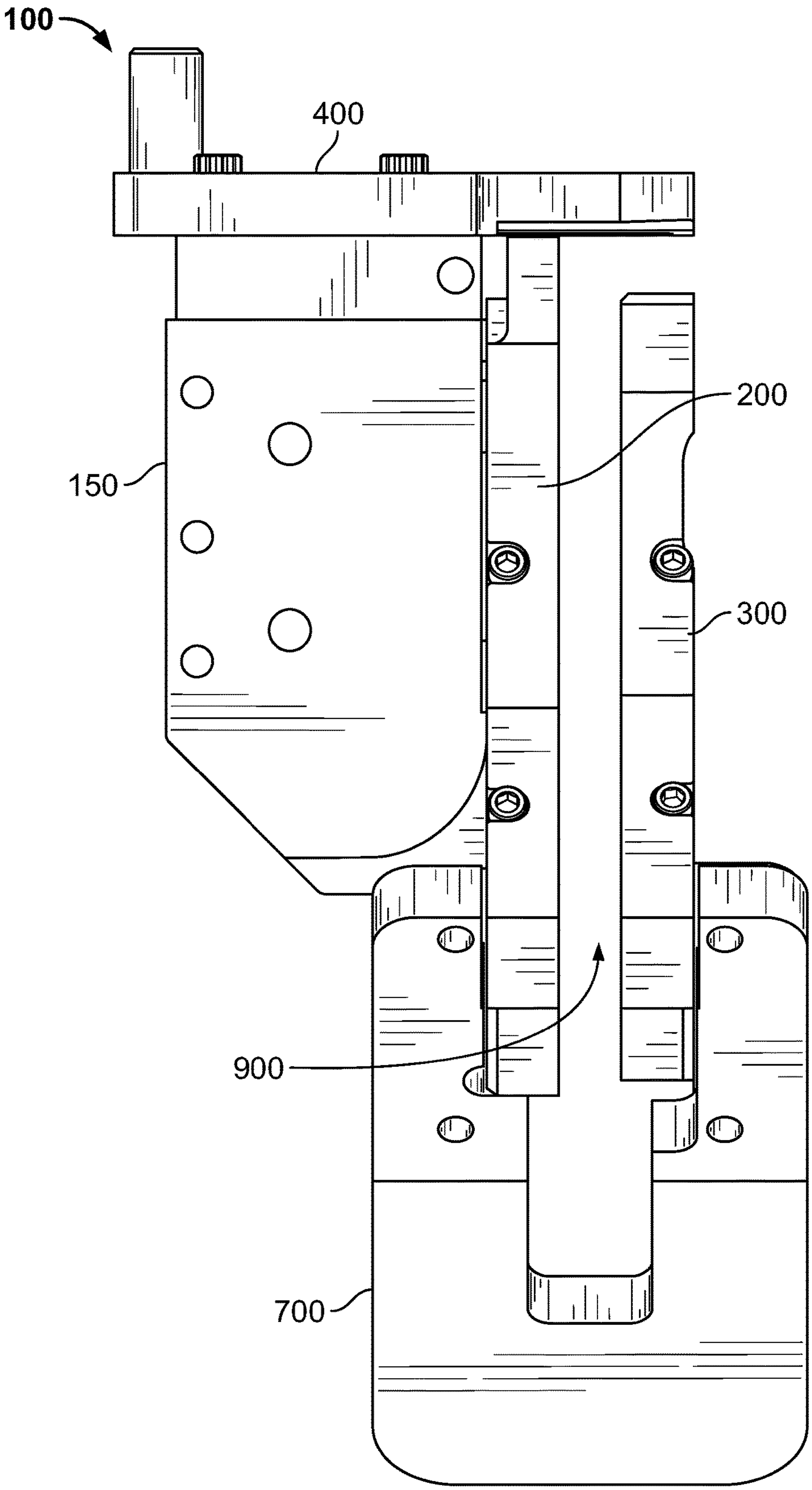
Figure 17:
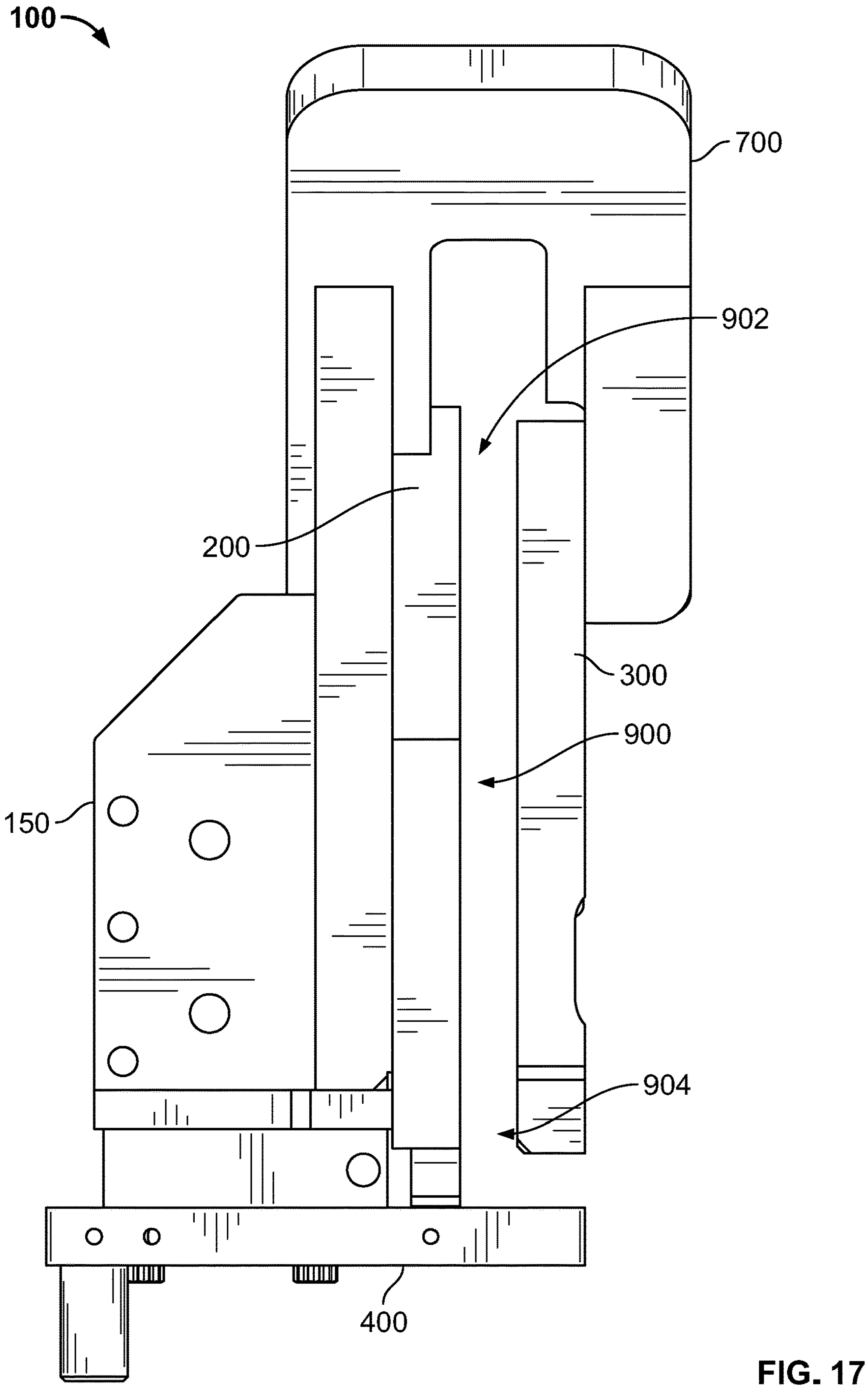

Turning to FIG. 15, the slope formed by the wear plate 200 is concave to further facilitate the railroad spikes in sliding from the inlet 902 to the outlet 904 in an orderly manner without jamming. Additionally, as illustrated in FIG. 14, the slope formed by the wear plate 300 also is concave to further facilitate the railroad spikes in sliding from the inlet 902 to the outlet 904 in an orderly manner without jamming.

Figure 19:
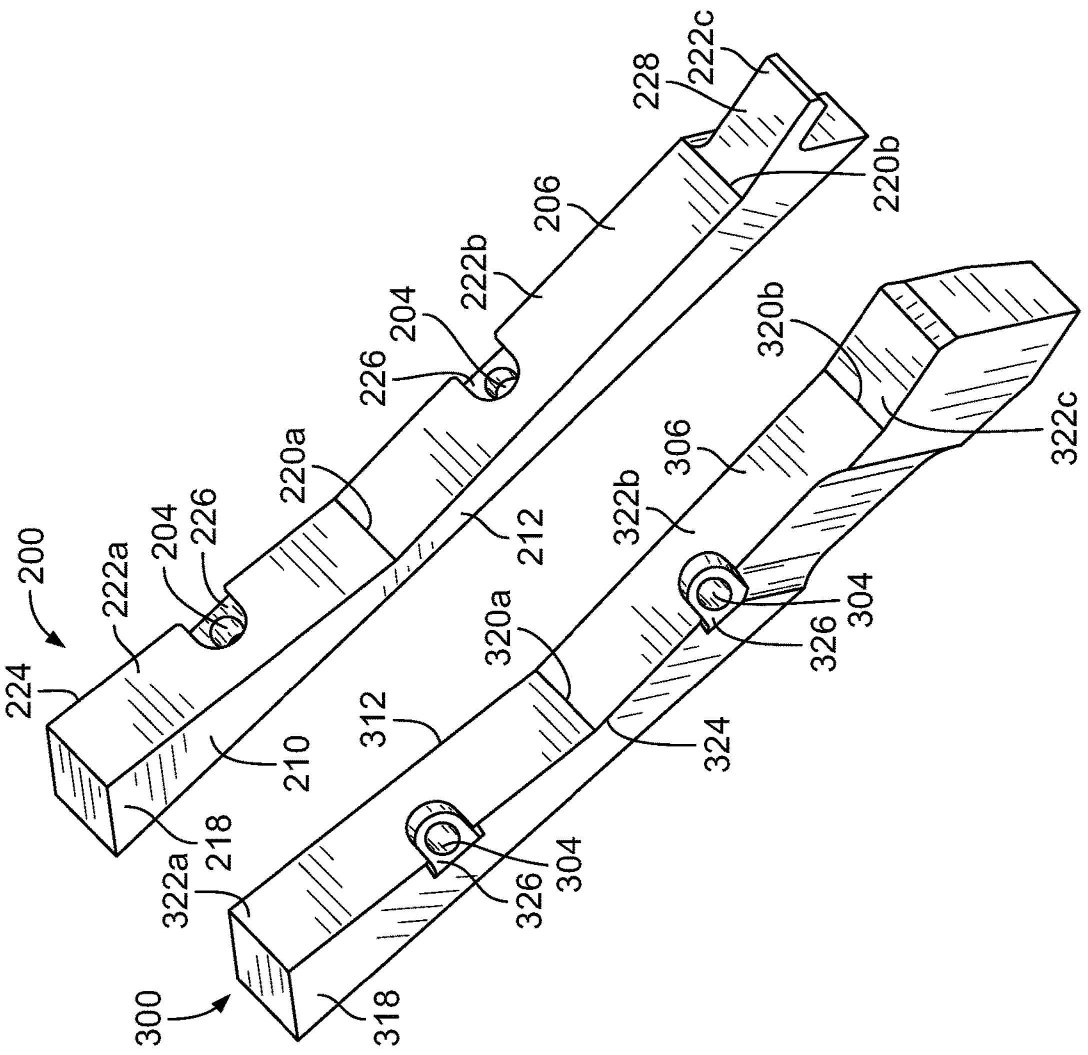
FIGS. 19-20 depict a plurality of views of example replaceable wear plates of the tray head of FIGS. 1-17.

FIGS. 19-20 further depict features of the wear plate 200 and the wear plate 300 that facilitate the railroad spikes in sliding through the channel 900 of the tray head 100. A body 218 of the wear plate 200 defines the lower surface 202, the upper surface 206, and the inner surface 210 extending between the lower surface 202 and the upper surface 206. The body 218 also defines the wear edge 212 between the upper surface 206 and the inner surface 210. The upper surface 206 and the wear edge 212 defined by the body 218 are concave to facilitate heads of railroad spikes to slide along the upper surface 206 and/or the wear edge 212 in an orderly manner. In some examples, the upper surface 206 and the wear edge 212 are curved to form the concave profile. In the illustrated example, the body 218 of the wear plate 200 defines obtuse angles 220 along the upper surface 206 and the wear edge 212 to define the concave profile. In the illustrated example, the body 218 defines an obtuse angle **220*a* (sometimes referred to as a first obtuse angle) that is formed between a portion 222*a* (sometimes referred to a first portion) and a portion 222*b* (sometimes referred to a second portion) of the upper surface 206 and/or the wear edge 212. The body 218 also defines an obtuse angle 220*b* (sometimes referred to as a second obtuse angle) that is formed between the portion 222*b* and a portion 222*c* (sometimes referred to a third portion) of the upper surface 206 and/or the wear edge 212. In other examples, the body 218 may be define more or less obtuse angles along the upper surface 206 and the wear edge 212** to define the concave profile.

Similarly, a body 318 of the wear plate 300 defines the lower surface 302, the upper surface 306, and the inner surface 310 extending between the lower surface 302 and the upper surface 306. The body 318 also defines the wear edge 312 between the upper surface 306 and the inner surface 310. The upper surface 306 and the wear edge 312 defined by the body 318 are concave to facilitate heads of railroad spikes to slide along the upper surface 306 and/or the wear edge 312 in an orderly manner. In some examples, the upper surface 306 and the wear edge 312 are curved to form the concave profile. In the illustrated example, the body 318 of the wear plate 300 defines obtuse angles 320 along the upper surface 206 and the wear edge 312 to define the concave profile. In the illustrated example, the body 318 defines an obtuse angle **320*a* (sometimes referred to as a first obtuse angle) that is formed between a portion 322*a* (sometimes referred to a first portion) and a portion 322*b* (sometimes referred to a second portion) of the upper surface 306 and/or the wear edge 312. The body 318 also defines an obtuse angle 320*b* (sometimes referred to as a second obtuse angle) that is formed between the portion 322*b* and a portion 322*c* (sometimes referred to a third portion) of the upper surface 306 and/or the wear edge 312. In other examples, the body 318 may be define more or less obtuse angles along the upper surface 306 and the wear edge 312** to define the concave profile.

To further facilitate the railroad spikes in sliding through the channel 900 of the tray head 100, the wear plates 200, 300 define the through holes 204, 304, respectively, such that the through holes 204, 304 and/or the fasteners 802 extending through the through holes 204, 304 do not interfere with the heads of the railroad spikes sliding along the wear plates 200, 300. For example, the wear plate 200 defines the through holes 204 to be located adjacent to an outer edge 224 that is opposite the wear edge 212. The through holes 204 are located away from the wear edge 212 to deter the through holes 204 from affecting movement of railroad spikes along the upper surface 206 and/or the wear edge 212. Similarly, the wear plate 300 defines the through holes 304 to be located adjacent to an outer edge 324 that is opposite the wear edge 312. The through holes 304 are located away from the wear edge 312 to deter the through holes 304 from affecting movement of railroad spikes along the upper surface 306 and/or the wear edge 312. Further, the wear plate 200 defines counterbore holes 226 that are concentrically aligned with the through holes 204 and extend from the upper surface 206 of the wear plate 200. The counterbore holes 226 are configured to house heads of the fasteners 802 received by the through holes 204 to deter the fasteners heads from extending beyond the upper surface 206 and affecting movement of railroad spikes along the upper surface 206 and/or the wear edge 212. Similarly, the wear plate 300 defines counterbore holes 326 that are concentrically aligned with the through holes 304 and extend from the upper surface 306 of the wear plate 300. The counterbore holes 326 are configured to house heads of the fasteners 802 received by the through holes 304 to deter the fasteners heads from extending beyond the upper surface 306 and affecting movement of railroad spikes along the upper surface 306 and/or the wear edge 312.

Further, the wear plate 200, 300 of the illustrated example are asymmetrical with respect to each other to further facilitate the railroad spikes in sliding between the inlet 902 and the outlet 904 in a controlled manner without jamming. For example, as illustrated in FIG. 1, the upper surface 206 and the wear edge 212 of the wear plate 200 are longer than the upper surface 306 and the wear edge 312 of the wear plate 300. In turn, the upper surface 206 and the wear edge 212 extend beyond the upper surface 306 and the wear edge 312 at the outlet 904 when the wear plates 200, 300 are coupled to the respective walls 500, 600. By being shorter than the wear plate 200 adjacent to the outlet 904 of the channel 900, the wear plate 300, in combination with the guide support 400, is configured to define the pathway 906 through which the railroad spikes are ejected from the tray head 100. Further, as illustrated in FIGS. 1 and 19, the wear plate 200 includes the shelf 228 that is positioned adjacent to the outlet 904 of the channel 900 when the wear plate 200 is coupled to the wall 500. The shelf 228 is configured to provide a surface and/or edge on which a railroad spike is configured to rest adjacent to the outlet 904 prior to being ejected from the tray head 100 through the pathway 906. Additionally, a portion of the wear plate 300 that is adjacent to the outlet 904 when the wear plate 300 is coupled to the wall 600 has a greater height than an opposing portion of the wear plate 200. That portion of the wear plate 300 has a greater height than the opposing portion of the wear plate 200 to further facilitate the railroad spikes in sliding to the outlet 904 in an organized manner without jamming.

Additionally, the wear plates 200, 300 of the illustrated example are formed of case-hardened material to deter the wear plates 200, 300 from being worn down over time by the railroad spikes. For example, the wear plates 200, 300 are formed of case-hardened steel, such as ferritic-nitrocarburized case-hardened steel. Further, the body 150 of the tray head 100, including the wall 500 and the wall 600, is formed from non-case-hardened material. For example, the body 150 is formed from low carbon steel, such as A36 steel, or other non-case-hardened material that is rigid and weldable. For example, the wear plates 200, 300 are case-hardened to increase the durability of the tray head 100, while the body 150 is not case-hardened to reduce the manufacturing costs of the tray head 100.

Over an extended period of time, portion(s) of the wear plate 200 and/or the wear plate 300 may wear down. For instance, (1) the upper surface 206, the inner surface 210, and/or the wear edge 212 of the wear plate 200 and/or (2) the upper surface 306, the inner surface 310, and/or the wear edge 312 of the wear plate 300 may wear down over time due to railroad spikes repeatedly sliding along such surface(s) and/or edge(s). The wear plates 200, 300 of the illustrated example are detachable wear plates that are configured to be replaced over time. That is, the wear plate 200 is configured be uncoupled from the wall 500 and replaced with new wear plate (e.g., a wear plate identical to that of the wear plate 200 before repeated use) if surface(s) and/or edge(s) of the wear plate 200 have worn down over time. Additionally, the wear plate 300 is configured be uncoupled from the wall 600 and replaced with new wear plate (e.g., a wear plate identical to that of the wear plate 300 before repeated use) if surface(s) and/or edge(s) of the wear plate 300 have worn down over time. Further, the wear plates 200, 300 are configured to be replaced while the body 150 of the tray head 100 remains coupled to the spike driving workhead to reduce maintenance time associated with the tray head 100. Additionally, because the wear plates 200, 300 are able to be replaced without replacing the body 150, maintenance costs associated with the tray head 100 are reduced.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A set of wear plates for a tray head of a spike dispenser, comprising:

a first wear plate configured to removably couple to a first sloped surface of a first wall of the tray head, wherein the first wear plate defines a first sloped wear edge along which a head of a railroad spike is to slide when the first wear plate is coupled to the first wall and a shank of the railroad spike travels through a channel; and a second wear plate configured to removably couple to a second sloped surface of a second wall of the tray head, wherein the second wear plate defines a second sloped wear edge along which the head of the railroad spike is to slide when the second wear plate is coupled to the second wall and the shank of the railroad spike travels through the channel, wherein, when coupled to the first and second walls, respectively, the first and second wear plates are configured to be parallel to and spaced apart from each other to at least partially define the channel.

2. The set of wear plates of claim 1, wherein the first wear plate and the second wear plate are asymmetrical with respect to each other.

3. The set of wear plates of claim 2, wherein the first sloped wear edge is longer than the second sloped wear edge.

4. The set of wear plates of claim 2, wherein the first wear plate includes a shelf, wherein the shelf is configured to extend beyond the second sloped wear edge and provide a surface on which the head of the railroad spike is to rest prior to ejection from the tray head.

5. The set of wear plates of claim 2, wherein an end of the second wear plate has a greater height than a corresponding end of the first wear plate.

6. The set of wear plates of claim 1, wherein each of the first wear plate and the second wear plate is case hardened.

7. The set of wear plates of claim 1, wherein the first sloped wear edge is concave.

8. The set of wear plates of claim 7, wherein the second sloped wear edge is concave.

9. The set of wear plates of claim 1, wherein the first wear plate defines first through holes through which first threaded fasteners are to extend to couple the first wear plate to the first wall.

10. The set of wear plates of claim 9, wherein the first wear plate defines counterbore holes that are concentrically aligned with the first through holes and extend from an upper surface of the first wear plate to deter the first threaded fasteners from extending beyond the upper surface when coupled to the first wall.

11. The set of wear plates of claim 9, wherein the first through holes are located along an outer edge opposite the first sloped wear edge to deter the first through holes from affecting movement of the head of the railroad spike along the first sloped wear edge.

12. The set of wear plates of claim 9, wherein the second wear plate defines second through holes through which second threaded fasteners are to extend to couple the second wear plate to the second wall.

13. The set of wear plates of claim 12, wherein the second wear plate defines counterbore holes that are concentrically aligned with the second through holes and extend from an upper surface of the second wear plate to deter the second threaded fasteners from extending beyond the upper surface when coupled to the second wall.

14. The set of wear plates of claim 12, wherein the second through holes are located along an outer edge opposite the second sloped wear edge to deter the second through holes from affecting movement of the head of the railroad spike along the second sloped wear edge.

* * * * *